US011331633B2

(12) United States Patent
Scholten et al.

(10) Patent No.: US 11,331,633 B2
(45) Date of Patent: May 17, 2022

(54) SUBMERSIBLE NANO-BUBBLE GENERATING DEVICE AND METHOD

(71) Applicant: Moleaer, Inc., Torrance, CA (US)

(72) Inventors: Bruce Scholten, Torrance, CA (US); Prathamesh Manik Shinde, Torrance, CA (US)

(73) Assignee: Moleaer, Inc, Carson, CA (US)

( * ) Notice: Subject to any disclaimer, the term of this patent is extended or adjusted under 35 U.S.C. 154(b) by 25 days.

(21) Appl. No.: 16/818,217

(22) Filed: Mar. 13, 2020

(65) Prior Publication Data

US 2020/0289992 A1 Sep. 17, 2020

Related U.S. Application Data

(60) Provisional application No. 62/818,573, filed on Mar. 14, 2019.

(51) Int. Cl.
*B01F 3/04* (2006.01)
(52) U.S. Cl.
CPC .............. *B01F 3/04262* (2013.01); *B01F 2003/04319* (2013.01); *B01F 2003/04361* (2013.01); *B01F 2003/04858* (2013.01); *B01F 2003/04865* (2013.01); *B01F 2215/0052* (2013.01)
(58) Field of Classification Search
CPC .......... B01F 3/04262; B01F 2215/0052; B01F 2003/04361; B01F 2003/04865; B01F 2003/04319; B01F 2003/04858; B01F 7/0075; B01F 3/04539; B01F 3/04595; B01F 2003/04546; B01F 2003/04567
See application file for complete search history.

(56) References Cited

U.S. PATENT DOCUMENTS

| 3,545,731 A | 12/1970 | McManus |
| 4,992,216 A | 2/1991 | Saita |
| 5,151,187 A | 9/1992 | Behmann |
| 5,415,891 A | 5/1995 | Liu et al. |

(Continued)

FOREIGN PATENT DOCUMENTS

| CN | 102665885 | 9/2012 |
| CN | 102688709 | 9/2012 |

(Continued)

OTHER PUBLICATIONS

International Search Report and Written Opinion in International Application No. PCT/US2020/022689, dated May 18, 2020, 10 pages.

(Continued)

*Primary Examiner* — Stephen Hobson
(74) *Attorney, Agent, or Firm* — Fish & Richardson P.C.

(57) ABSTRACT

An apparatus for producing nano-bubbles in a volume of liquid is described. The apparatus includes a motor having a rotatable shaft, an axially rotatable permeable member couplable to a gas inlet, and a rotatable tube support coupled to the rotatable shaft of the motor and having an inner cavity that houses the axially rotatable permeable member. When rotated, the axially rotatable permeable member is rotated so that the surface velocity of the rotatable permeable member simulates axial turbulent flow above the turbulent threshold in the liquid that allows the liquid to shear gas from the outer surface of the axially rotatable permeable member, thereby forming nano-bubbles in the liquid.

15 Claims, 17 Drawing Sheets

(56) References Cited

U.S. PATENT DOCUMENTS

| | | | |
|---|---|---|---|
| 5,674,433 | A | 10/1997 | Semmens et al. |
| 5,675,153 | A | 10/1997 | Snowball |
| 6,193,221 | B1 | 2/2001 | Sherman |
| 6,328,854 | B1 | 12/2001 | Sherman |
| 6,398,194 | B1 | 6/2002 | Tsai et al. |
| 7,496,692 | B2 | 2/2009 | Holm et al. |
| 7,591,452 | B2 | 9/2009 | Kohama et al. |
| 7,691,268 | B2 | 4/2010 | Yamasaki et al. |
| 8,186,653 | B2 | 5/2012 | Tsuji |
| 8,231,263 | B2 | 7/2012 | Windhab et al. |
| 8,267,572 | B2 | 9/2012 | Windhab |
| 8,317,165 | B2 | 11/2012 | Yamasaki et al. |
| 8,445,546 | B2 * | 5/2013 | Wood ............... A61K 41/0004 516/10 |
| 8,470,893 | B2 * | 6/2013 | Wood ............... A61K 33/00 516/10 |
| 8,500,104 | B2 | 8/2013 | Spears et al. |
| 8,726,918 | B2 | 5/2014 | Watanabe |
| 8,794,604 | B2 * | 8/2014 | Ryu ............... B01F 3/04262 261/122.1 |
| 8,906,241 | B2 | 12/2014 | Kerfoot |
| 8,919,747 | B2 | 12/2014 | Anzai et al. |
| 8,962,700 | B2 | 2/2015 | Wood et al. |
| 8,974,770 | B2 | 3/2015 | Chang et al. |
| 8,980,090 | B2 | 3/2015 | Choi et al. |
| 8,981,022 | B2 | 3/2015 | Shimoda |
| 9,034,195 | B2 * | 5/2015 | Wood ............... E21B 43/121 210/750 |
| 9,107,711 | B2 | 8/2015 | Hainard |
| 9,308,505 | B2 | 4/2016 | Spears et al. |
| 9,364,438 | B2 | 6/2016 | Murata et al. |
| 9,393,532 | B2 * | 7/2016 | Ramalingam ......... B01F 5/0465 |
| 9,416,329 | B2 | 8/2016 | Shiode et al. |
| 9,512,041 | B2 | 12/2016 | McEvoy et al. |
| 9,527,046 | B1 | 12/2016 | Roe |
| 9,624,113 | B2 | 4/2017 | Sloan |
| 2001/0022755 | A1 | 9/2001 | Holtzapple |
| 2006/0284325 | A1 | 12/2006 | Kohama et al. |
| 2007/0189972 | A1 | 8/2007 | Chiba et al. |
| 2007/0284316 | A1 | 12/2007 | Yamasaki et al. |
| 2007/0286795 | A1 | 12/2007 | Chiba et al. |
| 2008/0237141 | A1 | 10/2008 | Kerfoot |
| 2009/0139771 | A1 * | 6/2009 | Smith ............... E21B 21/14 175/69 |
| 2009/0188721 | A1 | 7/2009 | Smith |
| 2010/0077650 | A1 | 4/2010 | Shiode et al. |
| 2010/0126702 | A1 | 5/2010 | Tsunemori et al. |
| 2011/0241230 | A1 | 10/2011 | Kerfoot |
| 2013/0096489 | A1 | 4/2013 | Hassan et al. |
| 2013/0140246 | A1 | 6/2013 | Fabiyi |
| 2013/0175716 | A1 | 7/2013 | Weisshaar |
| 2014/0191425 | A1 | 7/2014 | Yano et al. |
| 2014/0238936 | A1 | 8/2014 | Fazel et al. |
| 2014/0339143 | A1 | 11/2014 | Kerfoot |
| 2015/0048904 | A1 | 2/2015 | Zhou |
| 2016/0023187 | A1 | 1/2016 | Hedlund et al. |
| 2016/0066760 | A1 | 3/2016 | Citsay |
| 2017/0259219 | A1 | 9/2017 | Russell |
| 2019/0060223 | A1 | 2/2019 | Yanzi |
| 2020/0003506 | A1 | 1/2020 | Russell |

FOREIGN PATENT DOCUMENTS

| | | |
|---|---|---|
| CN | 103747859 | 4/2014 |
| CN | 204454721 | 7/2015 |
| CN | 104888636 | 9/2015 |
| EP | 0157594 | 10/1985 |
| GB | 1427437 | 3/1976 |
| JP | 2008178870 | 8/2008 |
| JP | 2011088050 | 5/2011 |
| JP | 2013034958 | 2/2013 |
| JP | 2013056318 | 3/2013 |
| JP | 2013135834 | 7/2013 |
| WO | WO 2012/082265 | 6/2012 |
| WO | WO 2014/089443 | 6/2014 |
| WO | WO 2014/140291 | 9/2014 |
| WO | WO 2014/184585 | 11/2014 |
| WO | WO 2015/048904 | 4/2015 |

OTHER PUBLICATIONS

Baron and Nakagawa, "A tiny solution to a big problem: the use of nanobubbles in inhibiting silica scaling in geothermal systems," Proceedings, 42nd Workshop on Geothermal Reservoir Engineering, Feb. 2017.

Ebina et al., "Oxygen and Air Nanobubble Water Solution Promote the Growth of Plants, Fishes, and Mice," PLOS One, Jun. 2013, 8: e65339, 7 pages.

Enoch and Olesen, "Tansley Review No. 54 Plant response to irrigation with water enriched with carbon dioxide," New Phytol. ,1993, 125: 249-258.

Kang et al., "Effects of drinking hydrogen-rich water on the quality of life of patients treated with radiotherapy for liver tumors," Medical Gas Research, 2011, 1:11, 8 pages.

Kanimozhi and Kokila, "An Experimental Study on the Effect of Membrane Bubble Technology on Plant Growth," National Conference on Research Advances in Communication, Computation, Electrical Science and Structures, 2015, 54-58.

Kodama and Hinatsu, "Fluid Dynamics Field-Drag Reduction of Ships," In Micro- and Nanobubbles: Fundamentals and Applications, Chapter 10, 2014, 289-301.

Koide and Xue, "Carbon microbubbles sequestration: a novel technology for stable underground emplacement of greenhouse gases into wide variety of saline aquifers, fractured rocks and tight reservoirs," Energy Procedia, 2009, 1: 3655-3662.

Koide et al., "Subterranean Containment and Long-Term Storage of Carbon Dioxide in Unused Aquifers and in Depleted Natural Gas Reservoirs," Energy Convers., 1992, 33: 619-626.

Liu et al., "Stimulating effect of nanobubbles on the reactive oxygen species generation inside barley seeds as studied by the microscope spectrophotometer," Proceedings International Conference of Agricultural Engineering, Jul. 2014, 8 pages.

Mano, "Homeostatic Function of Nanobubble Water," In Micro- and Nanobubbles: Fundamentals and Applications, Chapter 12, 2014, 57 pages.

Matsuki et al., "Oxygen supersaturated fluid using fine micro/nanobubbles," International Journal of Nanomedicine, 2014, 9: 4495-4505.

Minamikawa et al., "Irrigation with oxygen-nanobubble water can reduce methane emission and arsenic dissolution in a flooded rice paddy," Environ, Res. Lett., 2015, 10: 084012, 11 pages.

Nakao et al., "Effectiveness of Hydrogen Rich Water on Antioxidant Status of Subjects with Potential Metabolic Syndrome—An Open Label Pilot Study," J. Clin. Biochem. Nutr., Mar. 2010, 46: 140-149.

Nakatake et al., "Effect of nano air-bubbles mixed into gas oil on common-rail diesel engine," Energy, 2013, 59: 233-239.

Oshita and Liu, "Nanobubble Characteristics and Its Application to Agriculture and Foods," Proceedings of AFHW, International Symposium on Agri-Foods for Health and Wealth, Aug. 2013, 23-32.

Palaniappan Arumugam, "Understanding the Fundamental Mechanisms of a Dynamic Micro-bubble Generator for Water Processing and Cleaning Applications," Thesis for the degree of Master of Applied Science, Department of Mechanical and Industrial Engineering, University of Toronto, 2015, 92 pages.

Tamaki et al., Experiment 2: Removal of Residual Pesticides in Vegetables Using Ozone Microbubbles, In Micro- and Nanobubbles: Fundamentals and Applications, Chapter 8.1.3, 2014, 5 pages.

Tsuge, "Characteristics of Microbubbles," In Micro- and Nanobubbles: Fundamentals and Applications, Chapter 1, 2014, 5 pages.

Tsutsumi et al., "Further Development of the Microbubble Generator to Improve the Potential for Oxygen Supply to the Water," In Micro- and Nanobubbles: Fundamentals and Applications, Chapter 8.2.4, 2014, 239-241.

www.sciencedaily.com [online], "Bubbly drinks inspire more effective cancer treatment," Jun. 2016 [retrieved on Jul. 18, 2017]

(56) References Cited

OTHER PUBLICATIONS

Retrieved from the Internet: <www.sciencedaily.com/releases/2016/06/16060810073Q.htm>. 3 pages.
Zimmerman et al., "Towards energy efficient nanobubble generation with fluidic oscillation," Current Opinion in Colloid & Interface Science, 2011, 17 pages.
International Preliminary Report on Patentability in International Appln. No. PCT/US2020/022689, dated Sep. 23, 2021, 8 pages.

\* cited by examiner

SUBMERSIBLE NANO-BUBBLE GENERATING DEVICE AND METHOD

CLAIM OF PRIORITY

This application claims priority under 35 USC § 119(e) to U.S. Patent Application Ser. No. 62/818,573, filed on Mar. 14, 2019, the entire contents of which are hereby incorporated by reference.

TECHNICAL FIELD

This disclosure relates to a submersible aeration device and methods for producing nano-bubbles in a liquid volume.

BACKGROUND

Various systems, such as pump or blower systems, have been used to supply gas to a volume of a liquid medium to obtain a desired gas saturation level in the liquid medium. Gas saturation is the ratio of the concentration of gas dissolved in the liquid medium to the maximum concentration of gas that can be dissolved in the liquid medium under stable equilibrium. An aeration system can recirculate liquid (e.g., water) using one or more pumps to dissolve gas into the liquid.

As an example, the amount of dissolved oxygen in a source of water can indicate its water quality. Various living organisms utilize the oxygen present in sources of water. In some cases, it is desirable to maintain a level of oxygen saturation in a liquid. In some cases, it is desirable to increase the amount of dissolved oxygen in water.

One disadvantage of the current systems is that many are not feasible or applicable under certain circumstances. For example, the aeration system may not be efficient for a large body of water (or other liquid mediums). Also, pumping to recirculate a large body of water may not be feasible due to inefficiencies or a lack of equipment accessibility. Consequently, there is a need for an alternative means for obtaining an increased oxygen saturation level in such conditions.

SUMMARY

As used herein, the term "nano-bubble" refers to a bubble that has a diameter of less than one micrometer (μm). A micro-bubble, which is larger than a nano-bubble, is a bubble that has a diameter greater than or equal to one μm and smaller than 50 μm. A macro-bubble is a bubble that has a diameter greater than or equal to 50 μm.

Described herein is an apparatus for producing nano-bubbles in a volume of a non-aerated liquid (e.g., water). The apparatus includes a motor, a rotatable permeable member, and a rotatable tube support. The motor includes a rotatable shaft. The rotatable permeable member includes a hollow body having a wall that extends along a longitudinal axis. The wall includes multiple pores through which gas introduced into the rotatable permeable member can flow within the hollow body. The distance of each pore location relative to the longitudinal axis is approximately same. The rotatable permeable member is couplable to a gas inlet configured to introduce gas from a gas source into the inside of the rotatable permeable member. The rotatable permeable member is coupled to the rotatable shaft of the motor and is an axially rotatable permeable member because it is adapted to axially rotate along with the rotatable shaft about the longitudinal axis.

The apparatus further includes a tube support with an elongate body having a wall and defining an inner cavity. The wall defines multiple perforations. The inner cavity of the tube support is configured to house the rotatable permeable member. The tube support is coupled to and rotatable along with the rotatable shaft of the motor. When rotated, the tube support is adapted to introduce the liquid into the inner cavity of the tube support and move the liquid away from an outer surface of the body of the rotatable permeable member.

When rotated, the rotatable permeable member and tube support simulates turbulent flow above the turbulent velocity threshold (e.g., 2 m/s or higher) in the liquid such that the liquid shears gas from the outer surface of the rotatable permeable member to form nano-bubbles. This "simulated" turbulent flow of the surrounding liquid at a level above the turbulent threshold can promote the formation of nano-bubbles by shearing gas from the surface of the rotatable permeable member to form the nano-bubbles and preventing them from coalescing.

This, and other aspects, can include one or more of the following features.

The rotatable permeable member can have an outer circumference defined by an outer diameter sized to simulate turbulent flow above the turbulent threshold of the liquid.

The pores of the rotatable permeable member can have a diameter in a range of from 200 nanometers (nm) to 50 μm, or a diameter that is less than or equal to 50 μm.

The rotatable permeable member can be coupled to the rotatable tube support.

The perforations of the rotatable tube support can be circular, semi-circular, rectangular, cubical, oblong, triangular, or slotted.

The apparatus can optionally include a base and a protective housing (for example, a casing or enclosure). The housing is defined by a lateral wall extending between a first end and a second end coupled to the base. The lateral wall is permeable to liquids (such as water). The lateral wall defines a plurality of perforations. In some implementations, the lateral wall can include a screen or mesh component. The rotatable permeable member and the tube support are disposed within the protective housing.

The protective housing is a non-rotatably affixed to the base.

The apparatus can include an impeller disposed within the protective housing. The impeller is adapted to induce flow of the liquid into and out of the rotatable tube support and away from the surface of the rotatable permeable member.

The nano-bubbles can have a mean diameter less than 500 nm, less than 200 nm, ranging from about 10 nm to about 500 nm, or ranging from about 75 nm to about 200 nm.

In some implementations, an apparatus for producing nano-bubbles in a volume of liquid includes a motor with a rotatable shaft and a rotatable permeable member. The rotatable permeable member includes a body having a wall and a plurality of pores through which gas introduced into the rotatable permeable member can flow. The rotatable permeable member couplable to a gas inlet configured to introduce gas from a gas source into the rotatable permeable member, the rotatable permeable member coupled to the rotatable shaft of the motor and adapted to rotate along with the rotatable shaft.

The rotatable permeable member further comprising at least one radially-extending member. The radially-extending member can include at least one wing, vane, propeller, or combinations thereof. The rotatable permeable member, when rotated with the at least one radially-extending member, is adapted to move the liquid away from an outer surface of the body of the rotatable permeable member and simulate turbulent flow above the turbulent threshold in the liquid that allows the liquid to shear gas from the outer surface of the rotatable permeable member, thereby forming nano-bubbles in the liquid.

Also described is a method for producing nano-bubbles in a volume of liquid using the above-described apparatus. At least a portion of the apparatus is submerged in a liquid. A gas is introduced from a gas source into the rotatable permeable member through the gas inlet at a gas pressure that forces the gas through the pores of the rotatable permeable member. Rotating the rotatable permeable member and tube support simulates turbulent flow above the turbulent velocity threshold in the liquid such that the liquid shears gas from the outer surface of the rotatable permeable member to form nano-bubbles.

The pressure of the gas flowing into the permeable member can range from about 1 atmosphere (atm) to about 10 atm.

The above-described apparatus and method can be used in a number of applications, including water treatment.

The above-described apparatus and method offer a number of advantages. For example, the generation of nano-bubbles can allow for more efficient diffusion and/or dissolution of gas in the surrounding liquid in comparison to the generation of bubbles of larger size. This higher transfer efficiency of nano-bubbles can be especially useful in applications where aeration is desired for a large body of liquid where it may not be feasible or practical to use traditional or current state of the art of aeration, such as pumping, to provide recirculation of the large body of liquid. Some non-limiting examples of such large bodies of liquid include a lake, a pond, a canal, and an ocean.

Rotation of the rotatable permeable member can be implemented by a driving mechanism that is submerged, partially submerged, or above the surface of the liquid in which aeration is desired. The rotatable permeable member and the tube support may be simultaneously rotated together. The gas flowed into the rotatable permeable member can be a low pressure gas (for example, a gas with a pressure equal to or less than 10 atmospheres), for example, from a blower or air pump. In some implementations, the device (including the rotatable permeable member and the driving mechanism) can be completely submerged in the liquid in which aeration is desired. In some implementations, the device can be used to generate nano-bubbles in a liquid without requiring the need to further pump (that is, induce flow in) the liquid in which aeration is desired. The device can be compact in size (for example, as small as 8 inches in diameter), such that the device can be placed within a confined space, such as a manhole. The device can be integrated with any rotating equipment that can provide sufficient rotation speed to the rotatable permeable member to generate nano-bubbles.

The apparatus provided herein advantageously simulates the flow condition necessary for producing nano-bubbles in a liquid under any flow condition (e.g., no flow, laminar flow or turbulent flow conditions). Exposure to actual turbulent flow or generating actual turbulent flow is therefore not required for nano-bubble production. Rotation of the rotatable permeable member simulates turbulent flow above the turbulent velocity threshold in the liquid such that the liquid shears gas from the outer surface of the rotatable permeable member to form nano-bubbles. Thus, the apparatus provides the benefit of producing nano-bubbles independent of the liquid flow condition.

The details of one or more implementations of the subject matter of this disclosure are set forth in the accompanying drawings and the description. Other features, aspects, anad advantages of the subject matter will become apparent from the description, the drawings, and the claims.

DETAILED DESCRIPTION

Figure 1A:
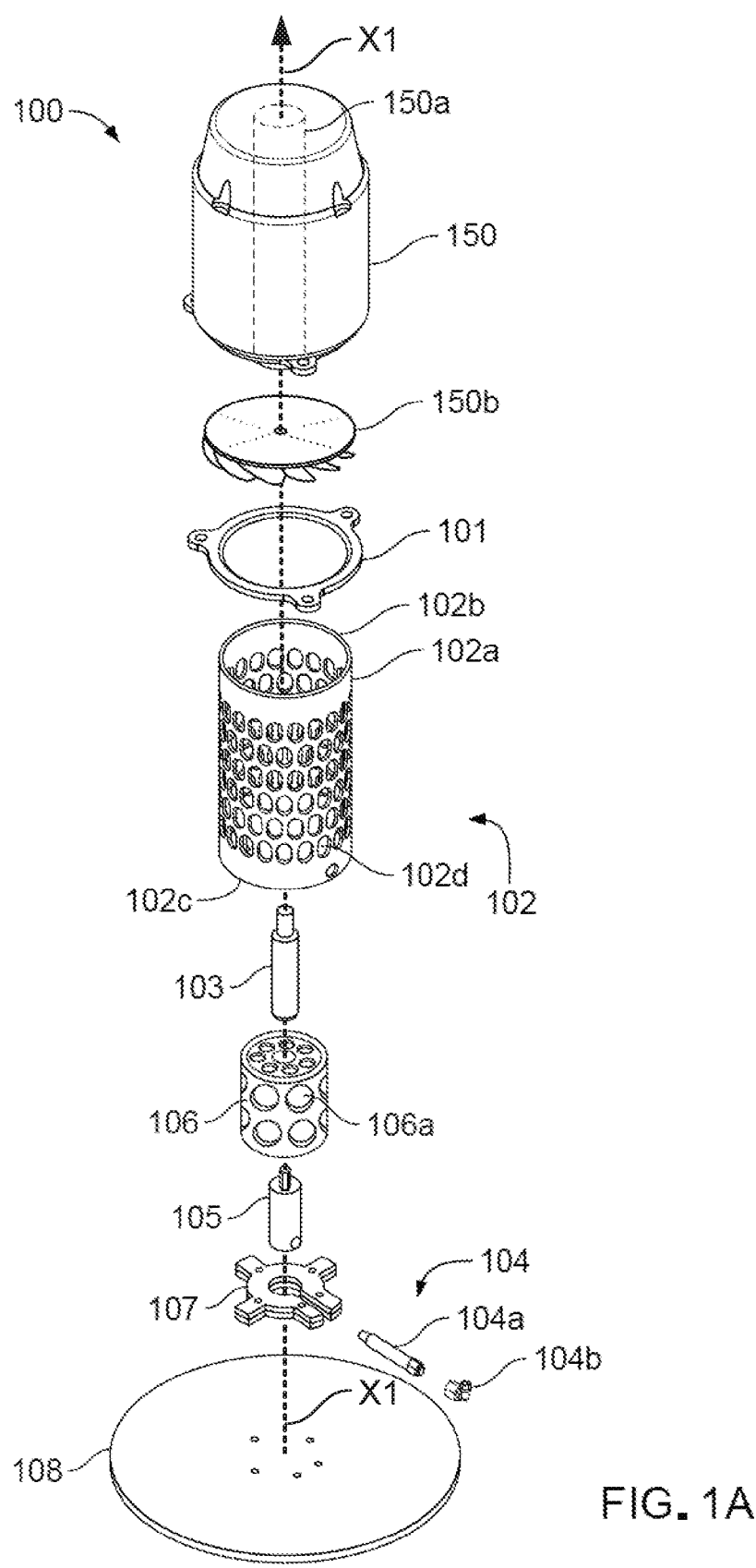
FIG. 1A is an exploded perspective view of an example aeration device.

This disclosure describes a submersible aeration device for producing nano-bubbles in a given volume of a liquid carrier (e.g., a body of water). A gas, such as oxygen, nitrogen, or air, can be flowed through the pores of a rotatable permeable member, where the liquid shears the gas under turbulent flow conditions above the turbulent threshold of the liquid created by rotation of the rotatable permeable member to generate nano-bubbles, which can aerate the liquid. The nano-bubbles have diameters less than one micrometer (μm). In some implementations, the nano-bubbles have diameters less than or equal to 200 nanometers (nm).

The aeration devices and methods can be implemented in a variety of settings. One example includes a tank that lacks fittings to couple to an additional aeration system. The aeration devices and methods described can also be implemented in a reactor and/or a tank installed at a wastewater treatment plant or other industrial facility; a manhole lift station or other pump station, in which the device can be lowered into a wet-well to transfer gas to a liquid; or the aeration devices and methods described can be implemented in a stormwater drain, a drainage ditch, or an irrigation ditch in which the liquid depth is low (for example, as little as 6 inches of liquid depth).

The aeration devices and methods described can also be implemented in a body of water, e.g., at the bottom of a body of water, for example, at an underwater depth of a few hundred feet, in a lake or other aquatic environment for the purpose of algae control and/or to increase oxygen levels.

Other applications of the aeration devices and methods include concrete production, for example, to alter one or more properties of the concrete. The aeration devices and methods described can also be implemented in a swimming pool to reduce the use of chorine or other oxidizers, or in canal treatment, for example, by a homeowner at a personal dock to restore the natural level of oxygen to stagnant water.

The aeration devices and methods described can be implemented in aquaponics and/or aquarium tanks, or in ponds, for example, a decorative pond in which it may not be desirable that auxiliary equipment (such as the aeration device) be located outside the pond. The aeration devices and methods described can be implemented in a bait tank to keep fish with satisfactory levels of oxygen, so they live longer, or in ocean aquafarming, for example, for fish and/or crustaceans. Other applications include manmade ponds, reservoirs, and/or distribution systems for holding water, such as those used to store and convey oilfield produced water, reclaimed water, treated wastewater, and/or potable water for aeration, oxidation, and oil separation.

FIGS. 1A-1K show an example aeration device 100. The device 100 includes a base 101, a driving mechanism 150 coupled to the base 101, a protective housing 102 coupled to the base 101, a rotatable permeable member 103 disposed within the protective housing 102, and a gas inlet 104 is indirectly coupled to the rotatable permeable member 103 (e.g., the gas inlet 104 can be indirectly coupled the rotatable permeable member via the bracket 107 and/or rotary union 105). The driving mechanism 150 can provide rotation. The driving mechanism 150 includes a rotatable component 150a. In some implementations, the driving mechanism 150 is a motor, and the rotatable component 150a is a rotatable shaft. In some implementations, the driving mechanism 150 is a gearbox, and the rotatable component 150a is a gear shaft.

The protective housing 102 is defined by a lateral wall 102a extending between a first end 102b and a second end 102c. The first end 102b is coupled to the base 101. The protective housing 102 defines multiple perforations 102d configured to pass liquid through the lateral wall 102a of the protective housing 102.

The rotatable permeable member 103 has a body defining a longitudinal axis "X1" (see FIG. 1A) and can be axially rotated about the longitudinal axis X1. The rotatable permeable member 103 is coupled to the rotatable component 150a of the driving mechanism 150 (for example, the rotatable shaft of the motor or the gear shaft of the gearbox), such that the rotatable permeable member 103 rotates with the rotatable component 150a of the driving mechanism 150.

In some implementations, such as in a gearbox driven system, the rotatable component 150a may be attached to the top of the shaft, and an entire drive shaft can be hollow. In such an example, gas is introduced above the surface of the liquid through the rotatable component 150a, and passes through the drive shaft and into the rotatable permeable member. The gas inlet 104 is configured to provide gas to the rotatable permeable member 103 through an indirect or direct coupling. The rotatable permeable member 103 is configured to expel gas through its pores. Liquid passing through protective housing 102 can shear the gas from the surface of rotating permeable member 103 to generate nano-bubbles from the gas.

The base 101 is coupled to the driving mechanism 150 (for example, the motor) by attaching the base 101 to the driving mechanism 150, for example, by one or more screws and/or a latch. The base 101 can secure one or more of the non-rotating portions of the device 100 (such as the protective housing 102) to a non-rotating portion of the driving mechanism (for example, a stator of the motor 150). Although shown in FIG. 1A as being generally circular, the base 101 can have any shape.

In various embodiments, the protective housing 102 is an optional component. The protective housing 102 can protect the components of the device 100 residing within the protective housing 102 (such as the rotatable permeable member 103) from coming in contact with foreign objects, such as stones, rags, or any other large solids that may be suspended in the surrounding liquid, as well as any other materials that may damage the inner components of the device 100. In some implementations, the protective housing 102 is coupled to the base 101 by welding, so the base 101 and the protective housing 102 form a unitary body. The perforations 102d pass liquid through the protective housing 102, so that liquid can flow to and from the inner components of the device 100 (such as the rotatable permeable member 103), as illustrated in FIG. 1K. Although shown in FIG. 1A as being generally circular, the perforations 102d can have any shape. The perforations 102d can be of uniform size or varying size. The perforations 102d can be uniformly or randomly distributed across the protective housing 102. The protective housing provides the benefit of allowing liquid to flow freely to the internal components of the device (e.g., the rotatable permeable member 103) while preventing debris (e.g., fibrous plants) from becoming entangled with the internal components.

The rotatable permeable member 103 can define multiple pores along its wall. In various implementations, the pores are positioned along the wall such that the center of each pore (along at least one transverse plane) is approximately equidistant from the longitudinal axis. Gas (such as air, oxygen, nitrogen, or ozone) can be supplied to the rotatable permeable member 103. As the permeable member 103 rotates, it simulates turbulent flow above the turbulent velocity threshold (e.g., 2 m/s or higher) in the surrounding liquid (e.g., water). This liquid then shears the gas exiting the pores to form the nano-bubbles dispersed in the surrounding liquid. Some non-limiting examples of materials that can be used to construct the rotatable permeable member 103 include metal, ceramic, and plastic. Although shown in FIG. 1A as being generally cylindrical, the rotatable permeable member 103 can have another shape, such as elongate member having an obloid cross-section. The rotatable permeable member 103 is described in more detail later.

The gas inlet 104 is configured to couple to a gas source, such as a blower or air pump or any other compressed gas source, so that gas can be introduced into the rotatable permeable member 103. In some implementations, the gas inlet 104 includes a pipe fitting 104a. In some implementations, the gas inlet 104 includes a gas tubing fitting 104b that can be coupled to the gas source.

The device 100 includes a rotary union 105 coupled to the rotatable permeable member 103 and/or to some or all of the other components of the device. A portion of the rotary union 105 coupled to the rotating permeable member 103 can rotate with the rotating permeable member 103, while a remaining portion of the rotary union 105 does not rotate with the rotating permeable member 103. For example, the rotating portion of the rotary union 105 can reside within a non-rotating housing of the rotary union 105. The gas inlet 104 can be coupled to the non-rotating portion of the rotary union 105. The rotary union 105 and the gas source can be coupled to opposite ends of the gas inlet 104. For example, the rotary union 105 can be coupled to a first end of the pipe fitting 104a, and the gas tubing fitting 104b can be coupled to a second end of the pipe fitting 104a opposite the first end. Gas can flow from the gas source, through the gas inlet 104 and into the rotatable permeable member 103 either directly or indirectly (for example, through a shaft and/or rotary union 104). The rotary union 105 can include a radial bearing that prevents radial deviation of the rotating portion of the rotary union 105 with respect to the non-rotating portion of the rotary union 105.

The device 100 also includes a tube support 106 coupled to the rotatable permeable member 103. The tube support 106 can be coupled to opposite ends of the rotatable permeable member 103 along the axis of rotation of the rotatable permeable member 103. The rotatable permeable member 103 is disposed within the tube support 106 in certain implementations. The rotatable permeable member 103 and the tube support 106 can be tubular members that are concentrically aligned. The tube support 106 can rotate with the rotatable permeable member 103. In some implementations, the tube support 106 is attached to the permeable member 103 (for example, by welding). In some implementations, the tube support 106 and the rotatable permeable member 103 are formed as a unitary body. The tube support 106 reduces or eliminates the twisting moment on the rotatable permeable member 103 in various implementations.

In FIGS. 3A-3D, the tube support 106 has a cylindrical body defined by a first wall (e.g., top wall), a second wall (e.g., bottom wall), and a tubular side wall extending between the first and second wall. The tube support 106 has an outer diameter that is larger than the outer diameter of the rotatable permeable member 103. In some implementations, the tube support 106 can define multiple perforations. The perforations can allow liquid to flow to and from the rotatable permeable member 103. The perforations can be disposed on a surface of the tube support 106's first wall, the second wall, the side wall, or combinations thereof. The perforations can be circular, semi-circular, rectangular, cubical, oblong, triangular, slotted, finned, and the like. The perforations can be of uniform size or varying size (e.g., the perforations can be gradually increase in size along an axial length of the tube support). The perforations of the tube support 106 are substantially larger than the pores of the permeable member 103 in various implementations. The perforations of the tube support may have the same or different shape as the pores of the permeable member 103. The perforations can be uniformly or randomly distributed across the tube support 106. Other examples of the tube support 106 are shown in FIGS. 3E and 3F.

Once the liquid has been aerated by the nano-bubbles generated by the rotating rotatable permeable member 103, it is desirable to transport the nano-bubble-containing liquid away from the rotatable permeable member 103, so that new liquid (which does not contain the nano-bubbles released from the rotatable permeable member) can flow to a surface (e.g., an outer surface) of the rotatable permeable member 103 and become aerated. Inducing surrounding liquid flow to and from the rotatable permeable member 103 can allow for continuous generation of nano-bubbles. During operation as the tube support 106 and the rotatable permeable member 103 rotate together, surrounding liquid can flow into the inner volume of the tube support 106 through perforations on the end surfaces of the tube support 106. The rotatable permeable member 103 can be rotated (for example, by the motor 150) at a rotational surface velocity that is equivalent to a transaxial flow rate that is equal to or greater than turbulent velocity of the liquid at the surface of the rotatable permeable member 103. Simulated turbulent flow of the surrounding liquid at a level above the turbulent threshold can promote the formation of nano-bubbles by shearing gas from the surface of the rotatable permeable member 103 to form the nano-bubbles and preventing them from coalescing. The rotational surface velocity can be considered to be simulating turbulent flow if the equivalent transaxial flow rate has a Reynolds number is greater than 3,500. The simulated turbulent flow performs the function of shearing gas bubbles from the surface of the rotatable permeable member 103.

During operation, the rotation of the tube support 106 can cause the liquid (with nano-bubbles generated by the rotatable permeable member 103) to flow radially outward through the perforations on the lateral surface of the tube support 106. The rotation of the tube support 106 provides the function of removing newly formed nano-bubbles from the vicinity of the surface of the rotatable permeable member 103 to prevent nano-bubble coalescence. Actual flow is produced by the action of the tube support 106 and the arrangement of the perforations defined by its various surfaces. When the tube support 106 is rotated, nano-bubble-containing liquid contained within the cavity between the rotatable permeable member and the tube support is flowed radially away from the rotatable permeable member and is replaced by new liquid flowing in from the perforations at the end surfaces of the tube support 106. Therefore, the rotation of the tube support 106 promotes circulation of the surrounding liquid to and from the surface of the rotatable permeable member 103 and therefore promotes the continuous generation of nano-bubbles.

The device 100 can include a bracket 107. The bracket 107 can be coupled to the housing 102 (for example, the second end 102c of the housing 102). In some implementations, the bracket 107 is welded to the housing 102. The bracket 107 can define an inner bore within which the rotary union 105 can reside. The bracket 107 can prevent rotation of the non-rotating portion of the rotary union 105 (for example, the housing of the rotary union 105), while the rotating portion of the rotary union 105 rotates with the rotatable permeable member 103. The bracket 107 can include a slot within which the gas inlet 104 can reside. In some implementations, the slot of the bracket 107 can prevent rotation of the gas inlet 104. For example, the slot of the bracket 107 can prevent the gas inlet 104 (which is coupled to the rotary union 105) from rotating with the rotary union 105.

The device 100 can include an optional plate 108. The plate 108 can be coupled to and cover an end of the protective housing 102 (for example, the second end 102c of the protective housing 102). In some implementations, the plate 108 and the base 101 are coupled to opposite ends of the protective housing 102.

The plate 108 can be used as a support for the device 100. For example, the plate 108 can provide a flat surface that allows the device 100 to rest stably on the floor or bed of a body of water. Various components of the device 100 can be coupled to the plate 108 to secure the components in place. For example, the bracket 107 can be coupled to the plate 108 with screws. In some implementations, the non-rotating portion of the rotary union 105 is coupled to the plate 108. Although shown in FIG. 1A as being generally circular, the plate 108 can have any shape. Various components of the device 100 can be centered or eccentrically positioned on the plate 108. For example, the housing 102 and the bracket 107 can be centered on the plate 108. Although shown in FIG. 1A as having a larger outer diameter than the housing 102, the plate 108 can have an outer diameter that is the same as the housing 102.

In some implementations, the device 100 includes a driving mechanism that can rotate the rotatable permeable member 103. For example, the device 100 can include the motor 150 including the rotatable shaft 150a. For example, the device 100 can include a gearbox (not shown). The driving mechanism can be configured to rotate at a pre-set range of rotational speed. The driving mechanism can be configured to rotate at several different pre-set ranges of rotational speed (for example, the rotational speed of the driving mechanism can be changed without steps over a range), for example, the driving mechanism can include a variable-speed drive. The driving mechanism can be submerged in, partially submerged in, or above the liquid in which aeration is desired. In some implementations, the motor 150 can be an electric motor, for example, an AC motor, a DC motor, a stepper motor, or a servo motor. In some implementations, the motor 150 is a battery-powered motor. In some implementations, the device 100 includes a right-angle gear box such that the motor 150 can be mounted above a volume of liquid (e.g., body of water).

In some implementations, the device 100 includes one or more impellers 150b coupled to the driving mechanism. Rotation of the one or more impellers 150b can induce liquid flow into and out of the tube support 106 (thereby promoting circulation of liquid) while nano-bubbles are generated by the rotatable permeable member 103.

Figure 1B:
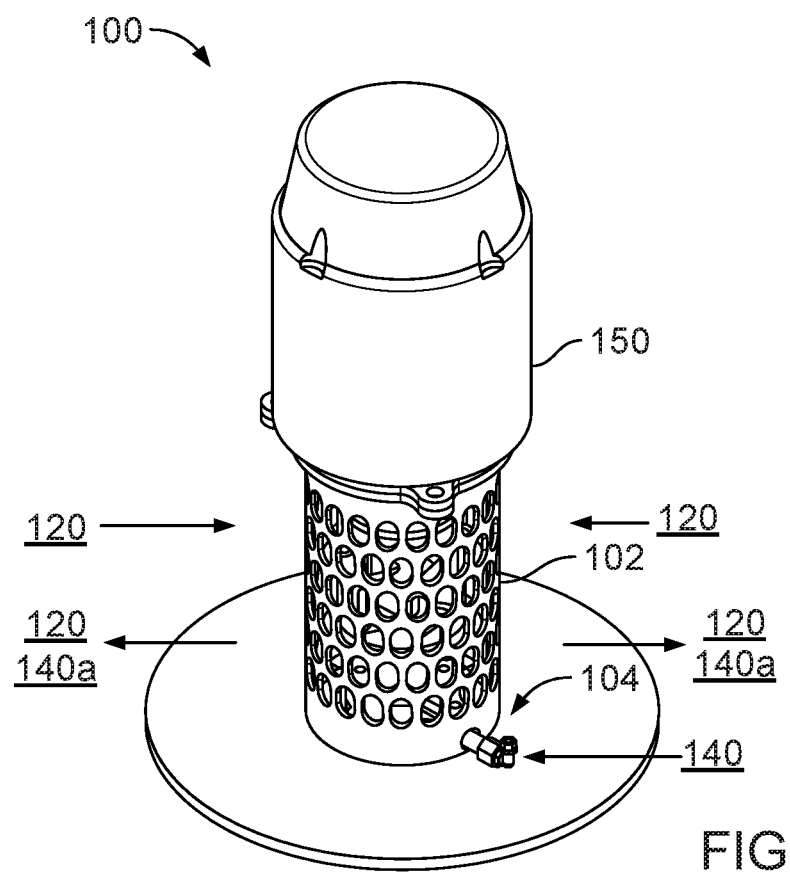
FIG. 1B is a perspective view of the aeration device of FIG. 1A in assembled form.

FIG. 1B shows the device 100 shown in FIG. 1A in assembled form. Gas 140 (such as oxygen, an inert gas (e.g., nitrogen), ozone, or air) is provided to the gas inlet 104. Gas 140 can flow directly or indirectly from the gas inlet 104 to the rotatable permeable member 103 (shown in FIG. 1A, but obstructed from view in FIG. 1B by the perforated housing 102). As the gas 140 flows through the pores of the rotatable permeable member 103 during rotation of the rotatable permeable member 103, nano-bubbles 140a are generated and dispersed in the liquid 120 flowing into and out of the tube support 106 (shown in FIG. 1A, but obstructed from view in FIG. 1B) and the protective housing 102.

In some implementations, the apparatus provided herein can operate in a medium that contains a composition that includes a liquid, such as a slurry (for example, a mixture of solid and liquid). Some non-limiting examples of the liquid 120 include liquids including water (such as pond water, wastewater, or produced water) and cement slurries. Flow of the liquid 120 into and out of the tube support can be induced, for example, by rotation of one or more impellers (not shown). The rotation of the various components of the device 100 (such as the rotatable permeable member 103) can be provided by a driving mechanism, for example, the motor 150.

Figure 1C:
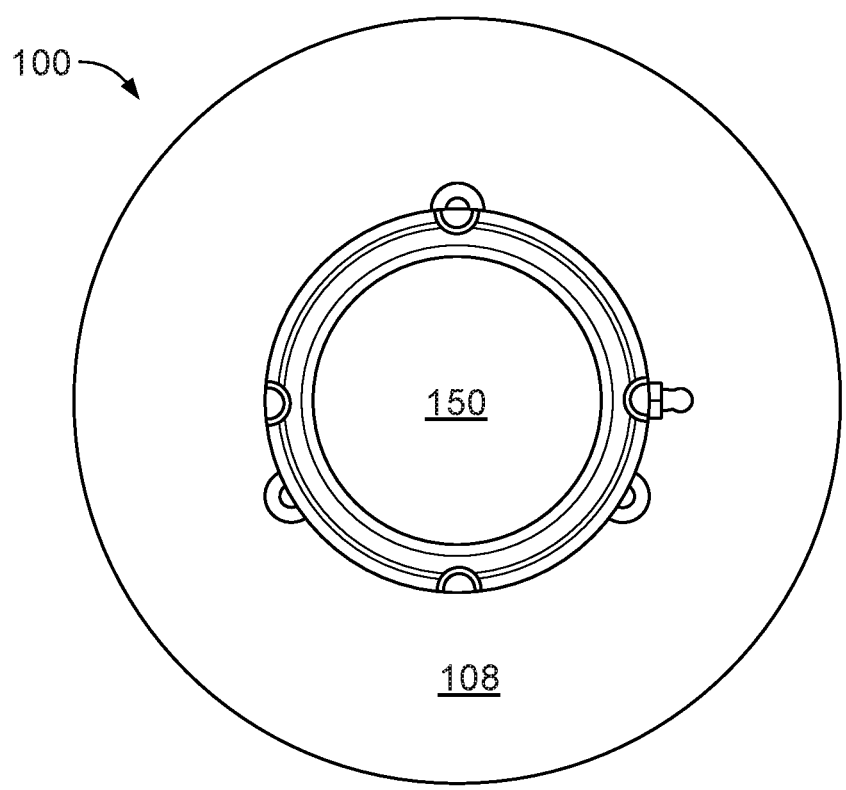
FIG. 1C is a top view of the aeration device of FIG. 1A in assembled form.
Figure 1D:
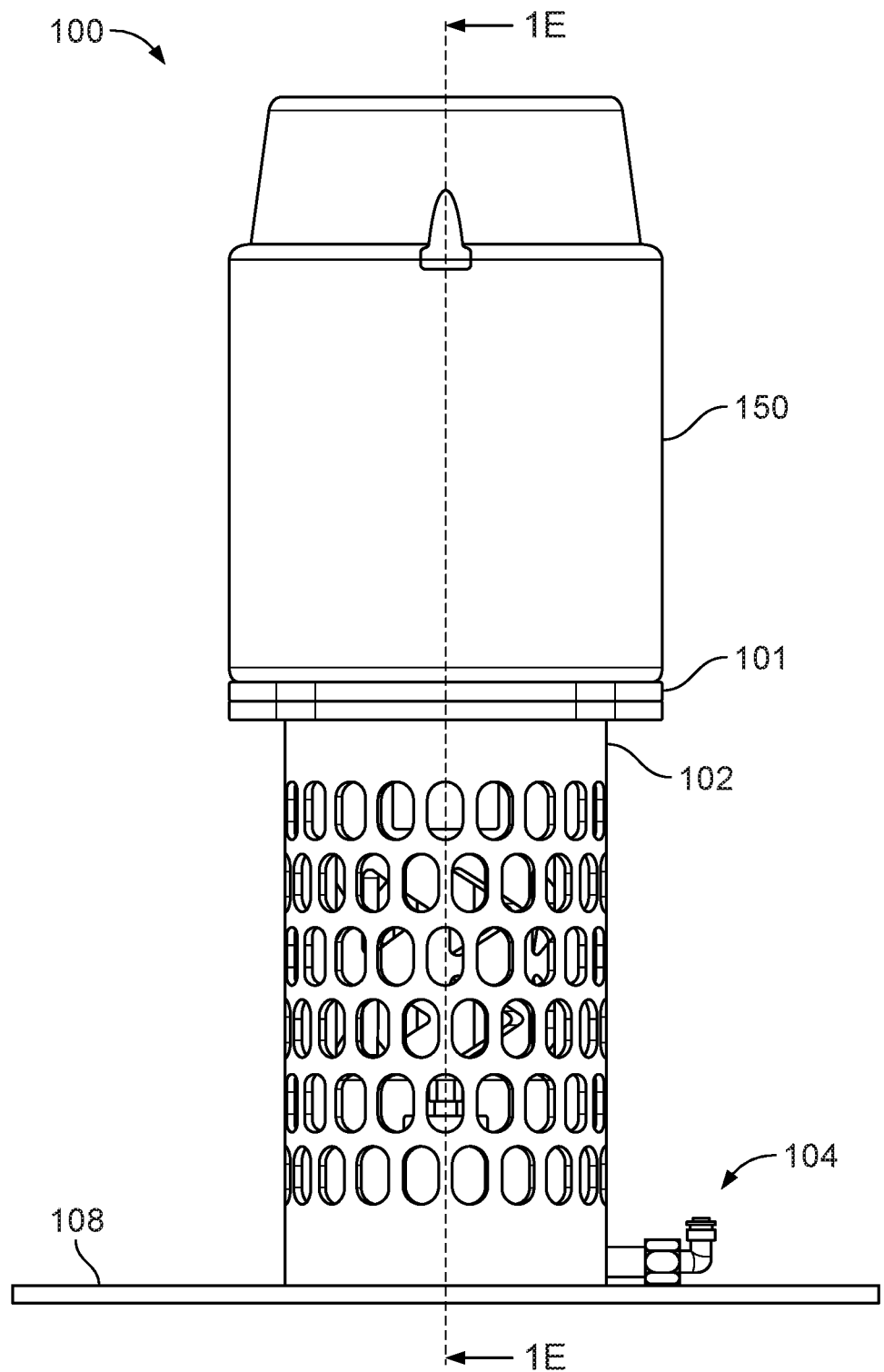
FIG. 1D is a side view of the aeration device of FIG. 1A in assembled form.
Figure 1E:
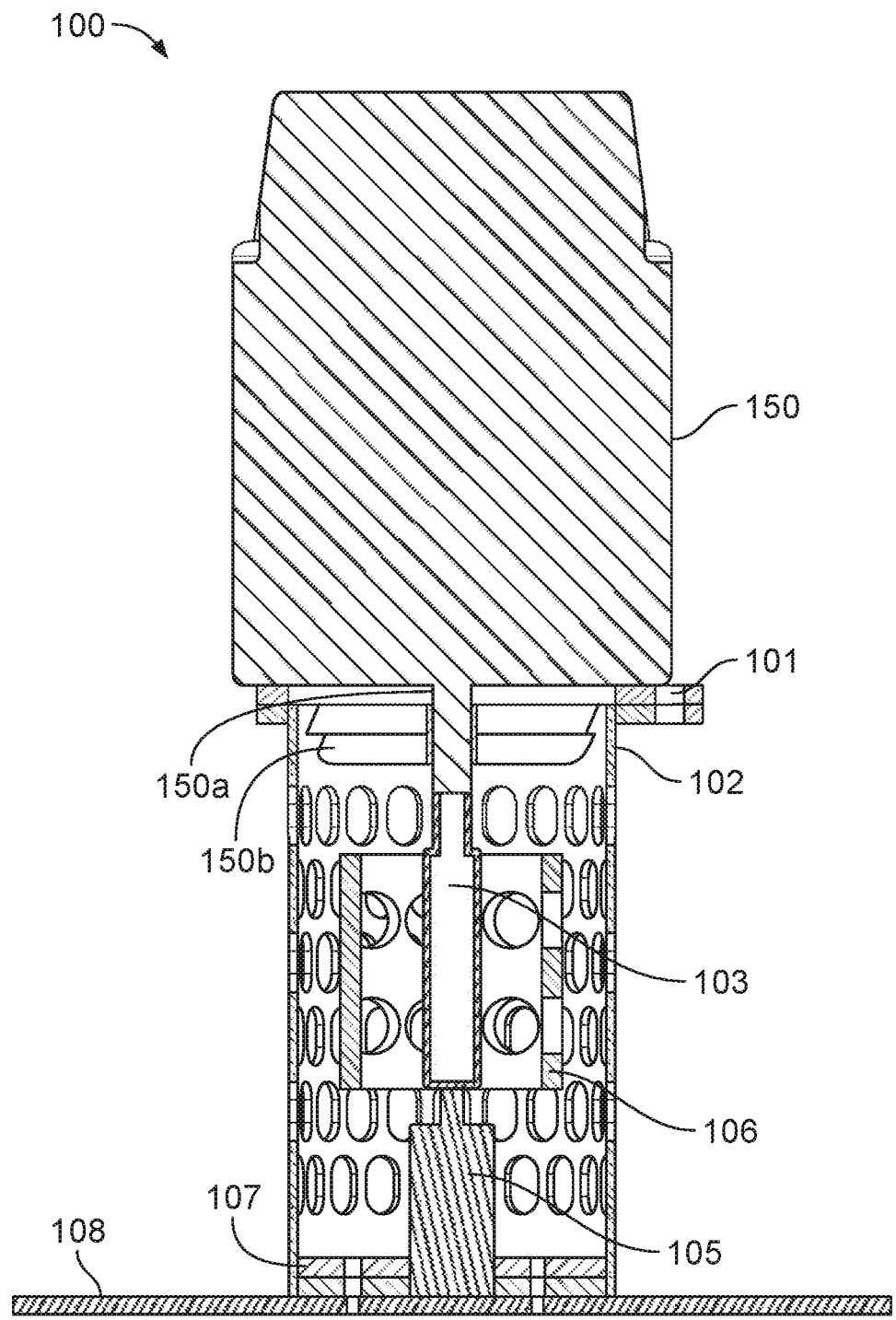
FIG. 1E is a cross-section of the side view shown in FIG. 1D.
Figure 1F:
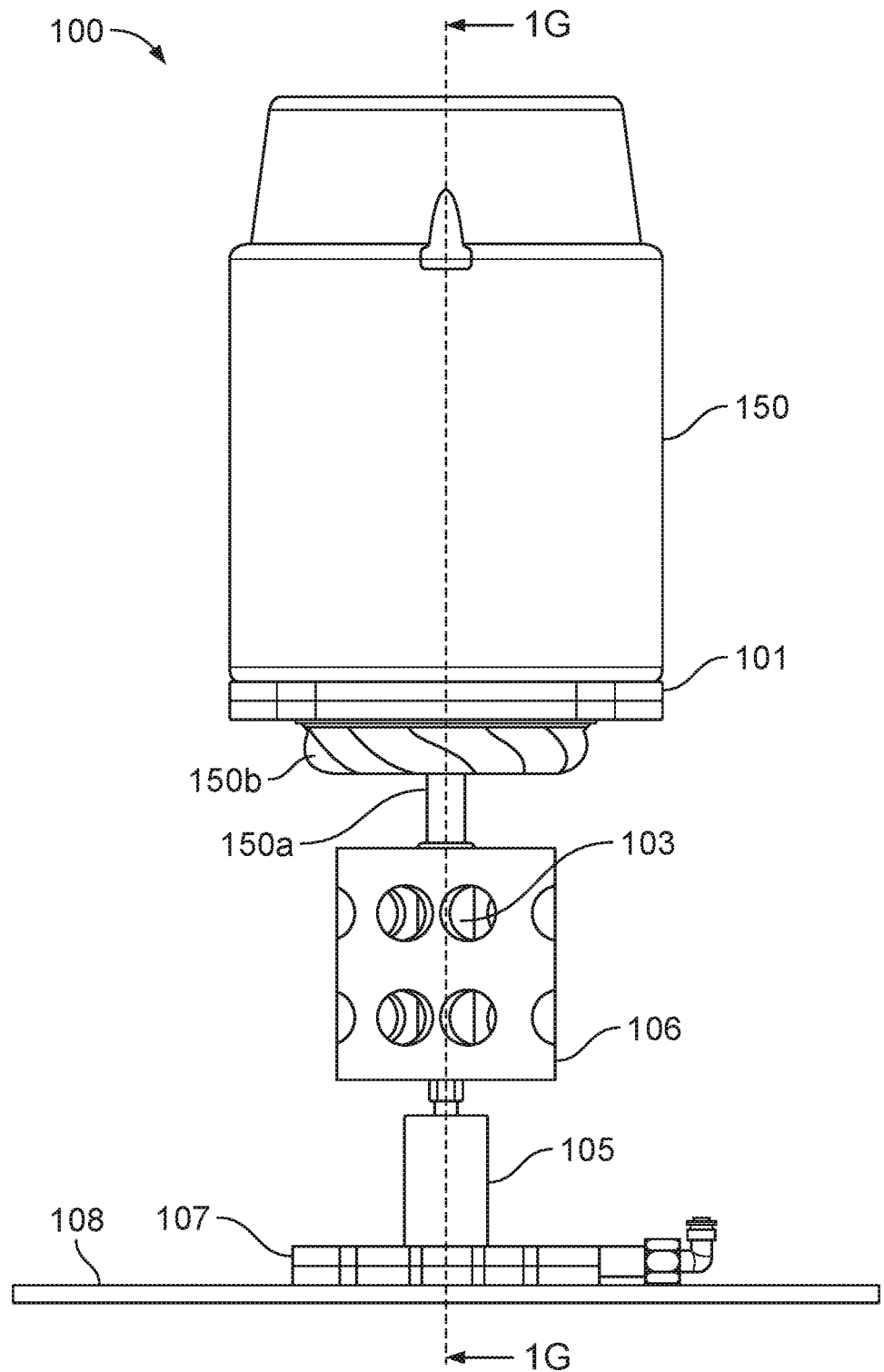
FIG. 1F is a side view of the aeration device of FIG. 1A with the housing removed.
Figure 1G:
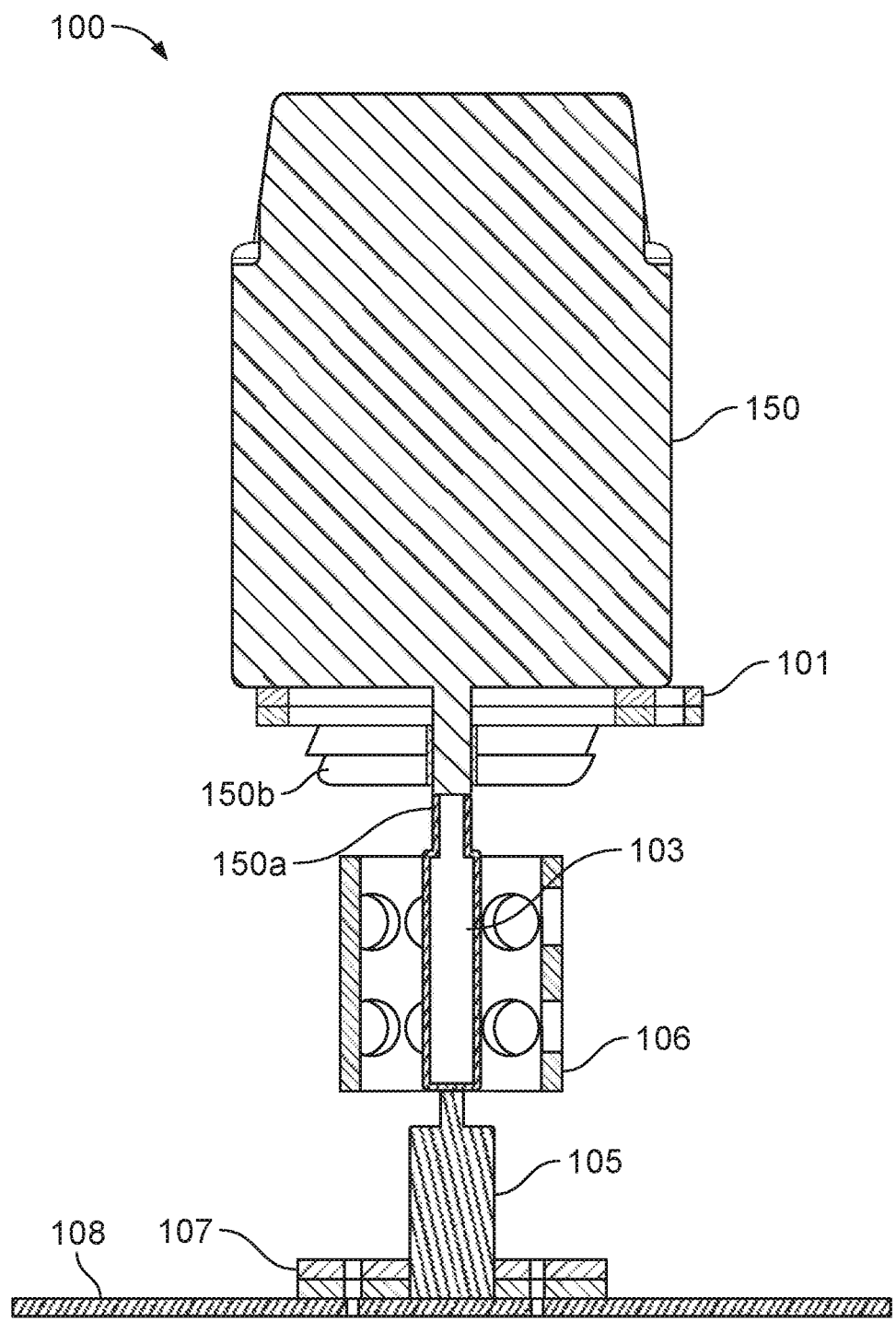
FIG. 1G is a cross-section of the side view shown in FIG. 1F.
Figure 1H:
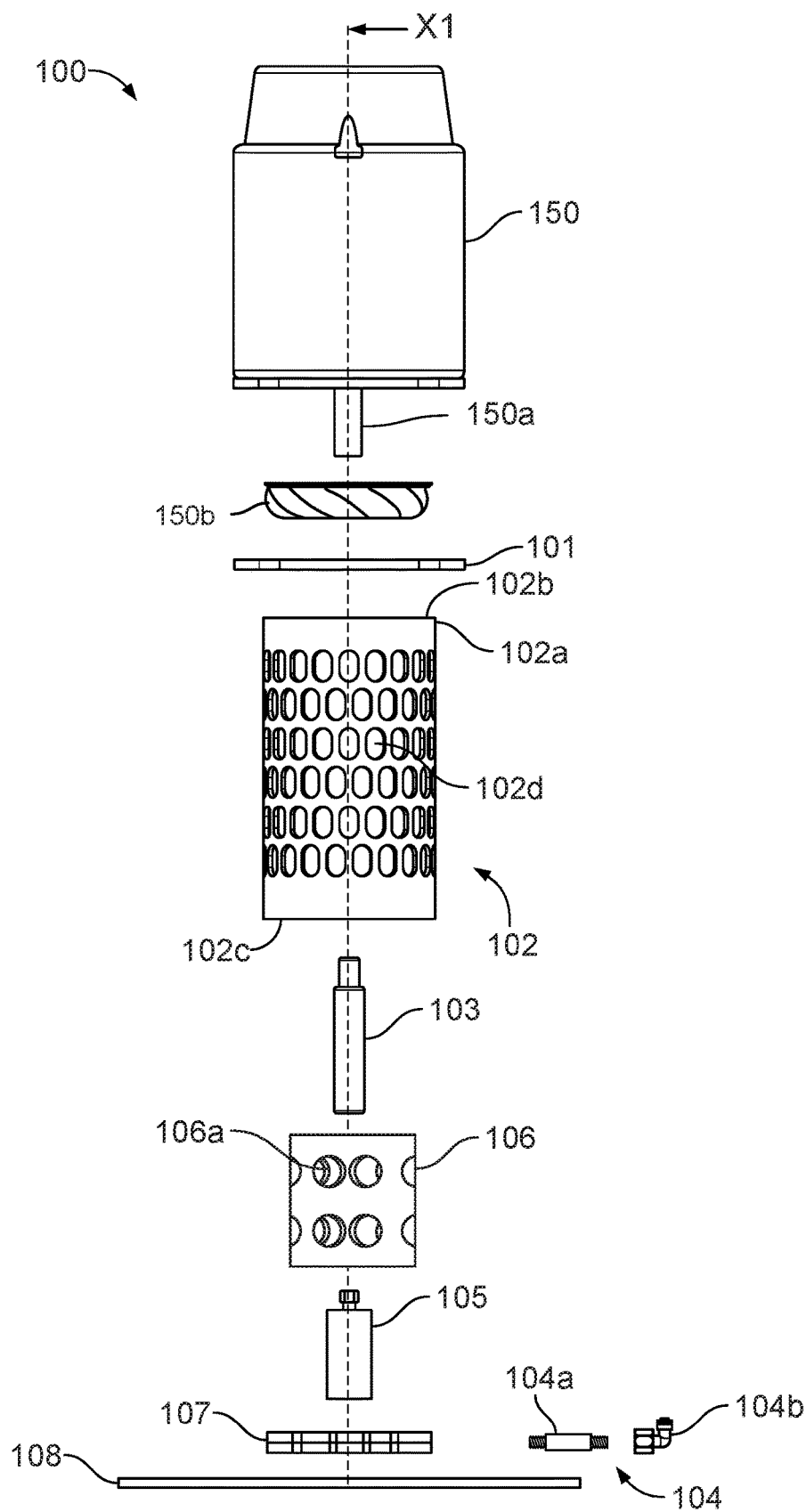
FIG. 1H is an exploded side view of the aeration device of FIG. 1A.
Figure 1J:
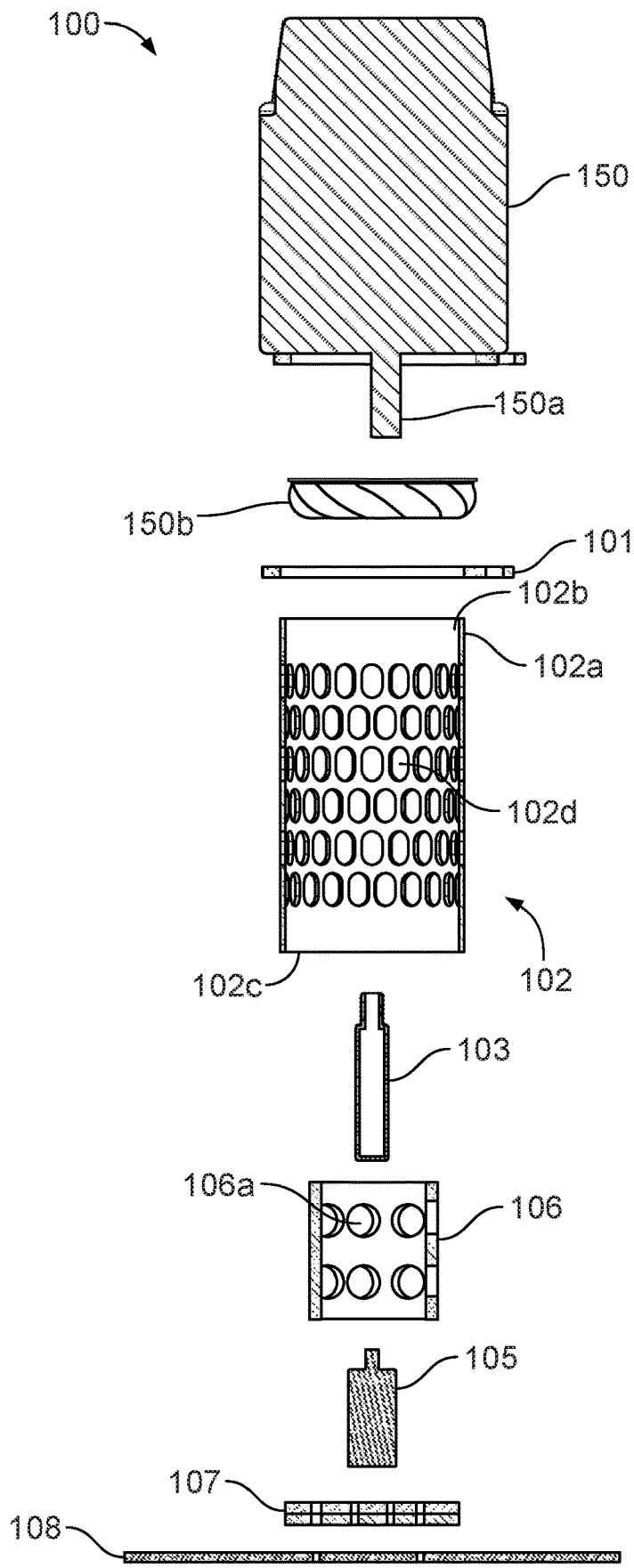
FIG. 1J is a cross-section of the exploded side view shown in FIG. 1H.
Figure 1K:
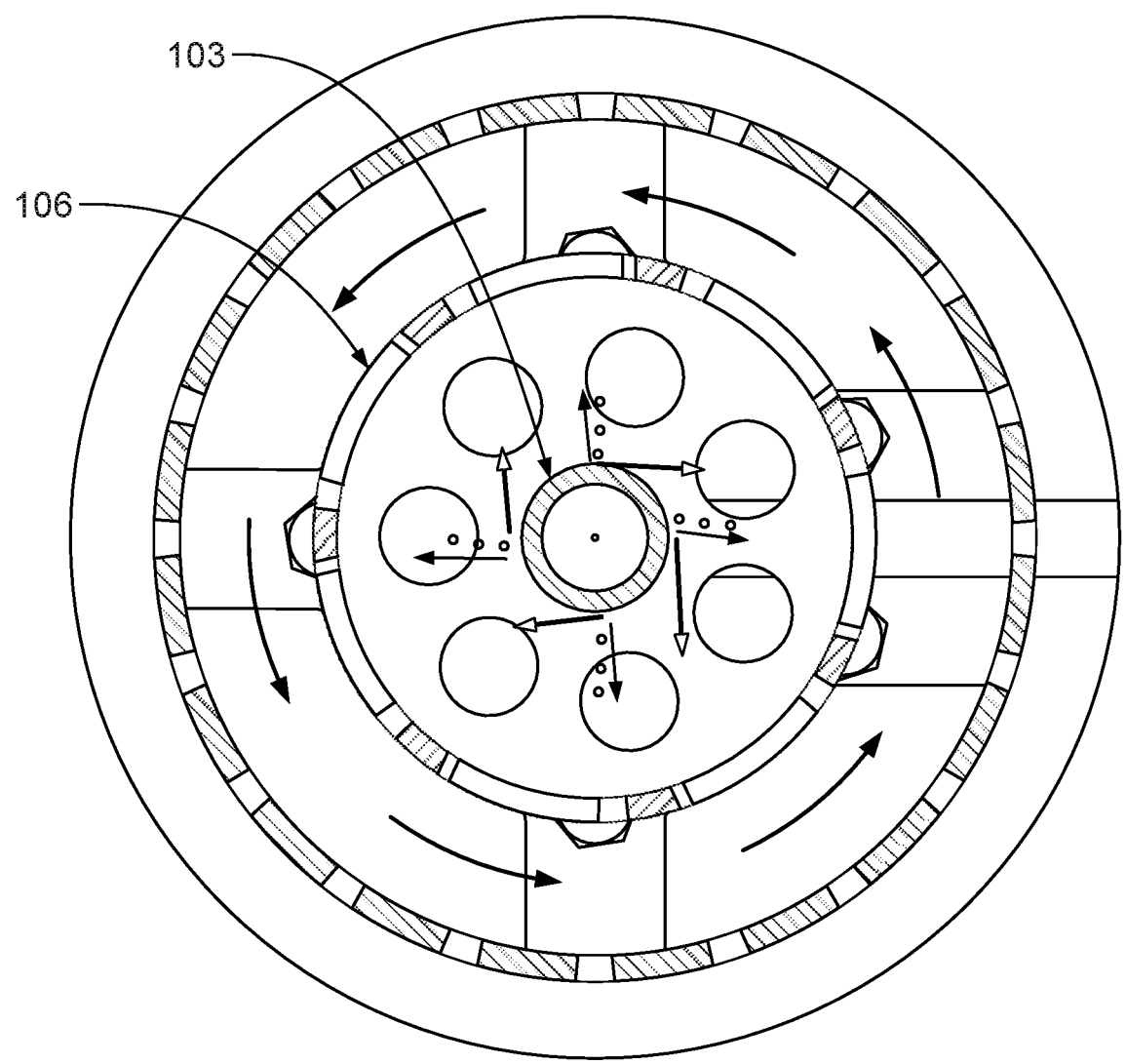
FIG. 1K is a top cross-sectional view of the aeration device of FIG. 1A.

FIGS. 1C through 1J show various views of the device 100. FIG. 1C shows a top view of the device 100 in assembled form. FIG. 1D shows a side view of the device 100 in assembled form. FIG. 1E shows cross-section of the side view shown in FIG. 1D. FIG. 1F shows a side view of the device 100 with the housing 102 removed. FIG. 1G shows cross-section of the side view shown in FIG. 1F. FIG. 1H shows an exploded side view of the device 100. FIG. 1J shows cross-section of the exploded side view shown in FIG. 1H.

FIG. 1K shows a top cross-sectional view of the rotatable permeable member 103 and the tube support 106 rotating within the protective housing 102. As gas 140 is injected into the rotatable permeable member 103 and exits the rotatable permeable member 103, nano-bubbles 140a are formed by the gas 140 exiting the pores (103a, not shown) and shearing force of the surrounding liquid 120 simulating turbulent flow above the turbulent threshold at the outer surface of the rotatable permeable member 103.

Figure 2A:
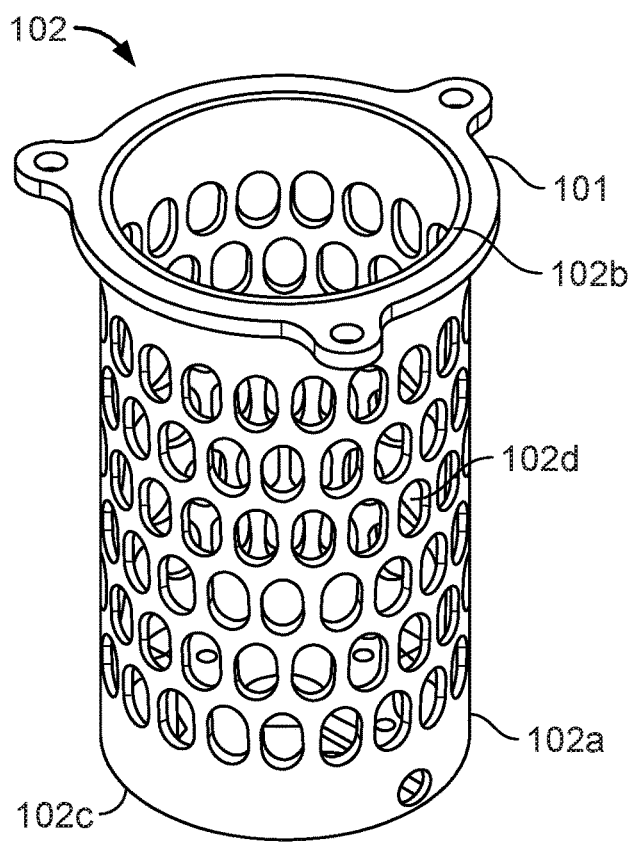
FIG. 2A is a top perspective view of a non-rotating portion of the aeration device of FIG. 1A.
Figure 2B:
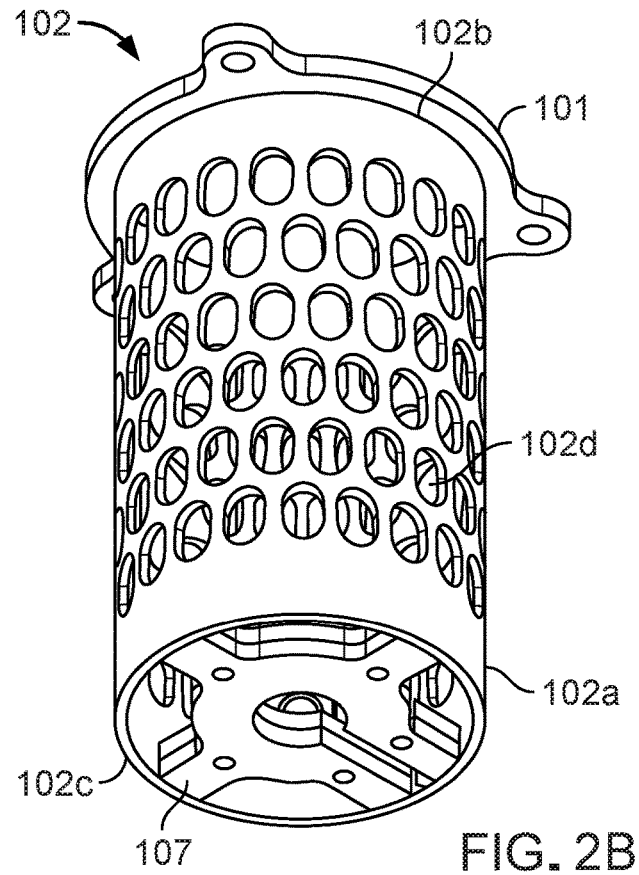
FIG. 2B is a bottom perspective view of the non-rotating portion shown in FIG. 2A.
Figure 2C:
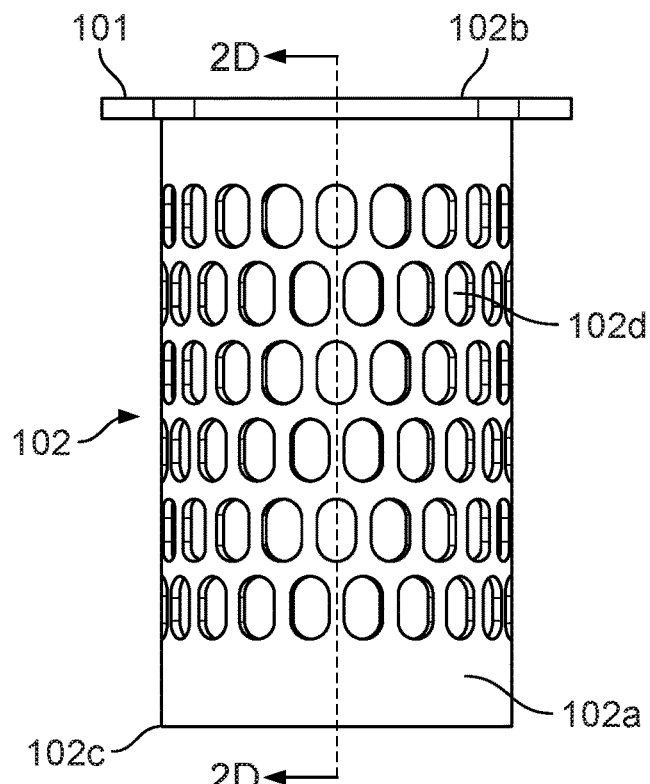
FIG. 2C is a side view of the non-rotating portion shown in FIG. 2A.
Figure 2D:
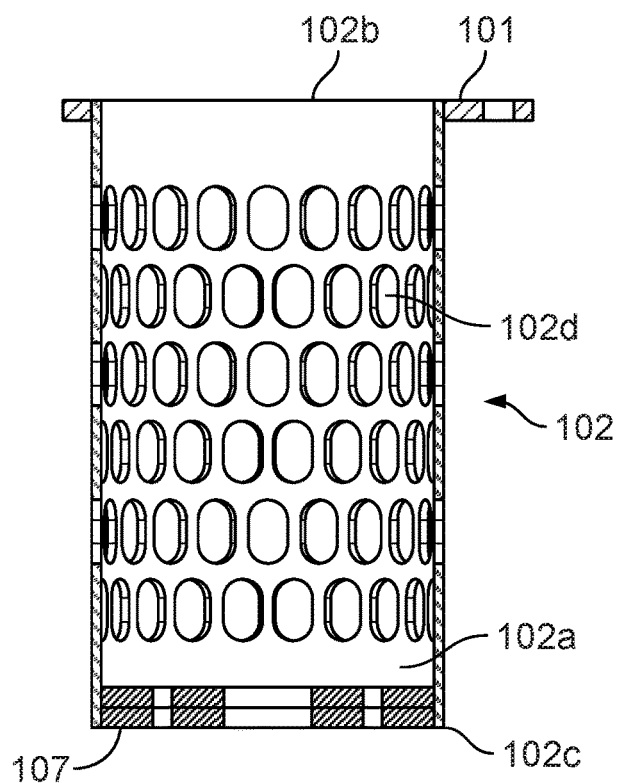
FIG. 2D is a cross-section of the side view of the non-rotating portion shown in FIG. 2C.

FIGS. 2A through 2D show various views of a few optional, non-rotating components of the device 100, such as the base 101, the protective housing 102, and the bracket 107. FIG. 2A shows a top perspective view of those non-rotating components of the device 100 in assembled form. FIG. 2B shows a bottom perspective view of those non-rotating components of the device 100 in assembled form. FIG. 2C shows a side view of those non-rotating components of the device 100 in assembled form. FIG. 2D shows a cross-section of the side view shown in FIG. 2C.

Figure 3A:
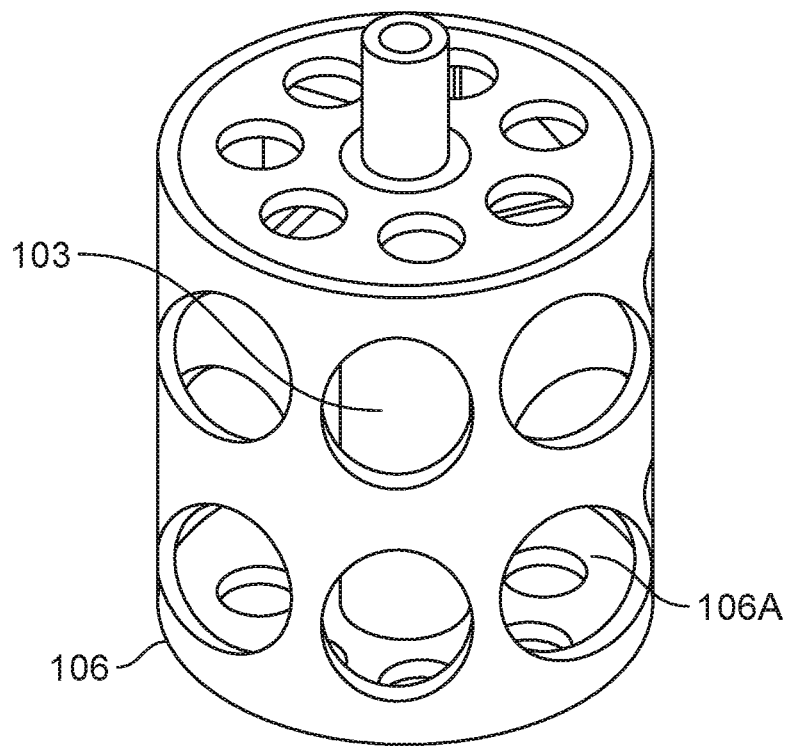
FIG. 3A is a top perspective view of a rotating portion of the aeration device of FIG. 1A.
Figure 3B:
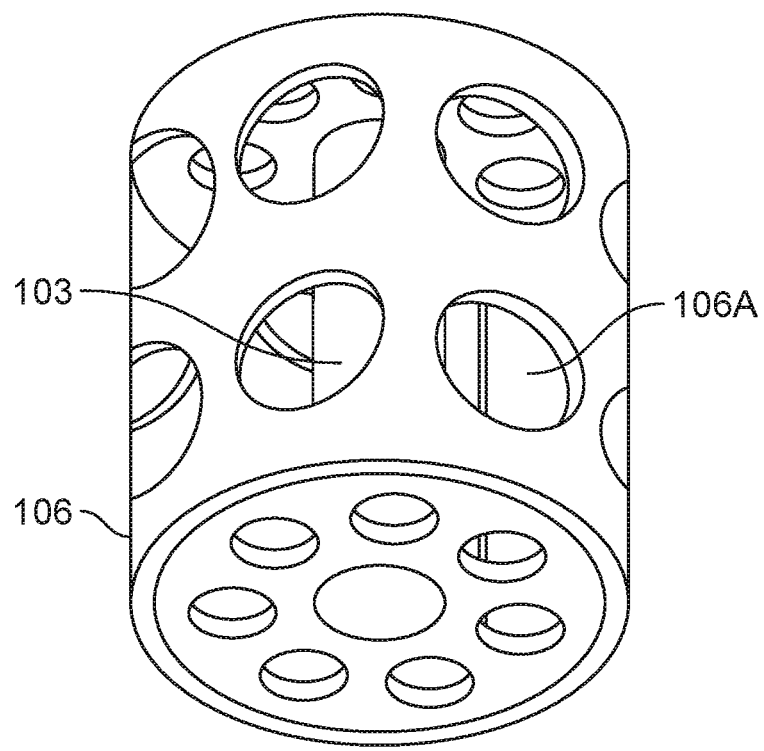
FIG. 3B is a bottom perspective view of the rotating portion shown in FIG. 3A.
Figure 3C:
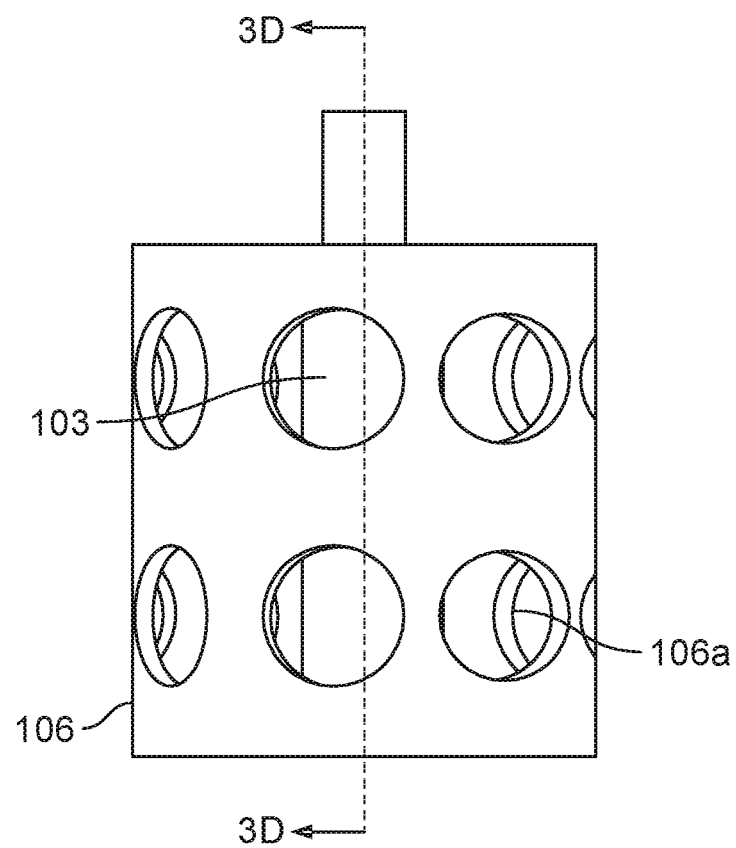
FIG. 3C is a side view of the rotating portion shown in FIG. 3A.
Figure 3D:
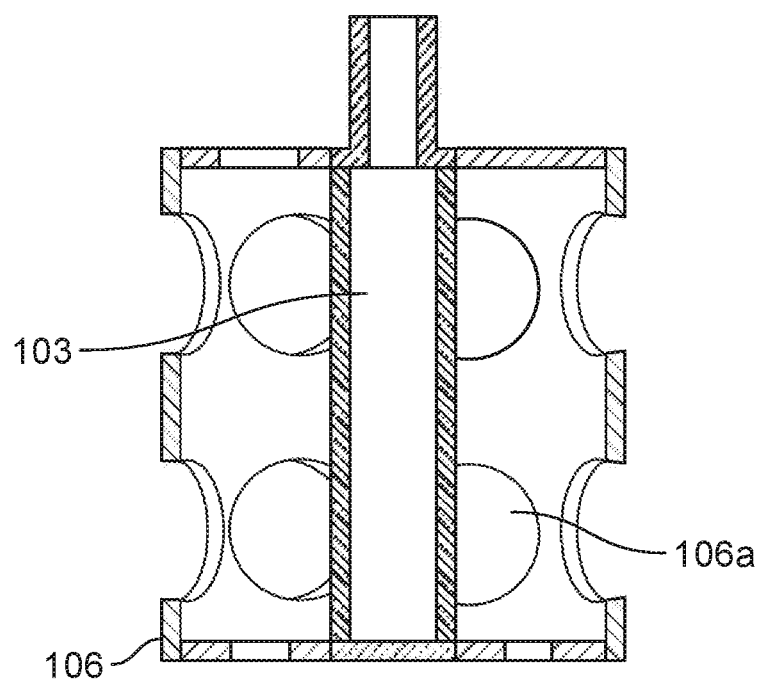
FIG. 3D is a cross-section of the side view of the rotating portion shown in FIG. 4C.
Figure 3E:
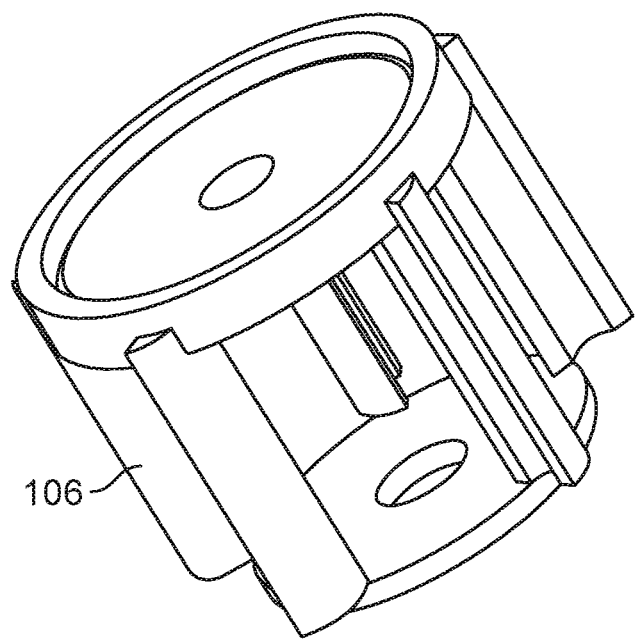
FIG. 3E is a perspective view of an example of a tube support that can be included in the aeration device of FIG. 1A.
Figure 3F:
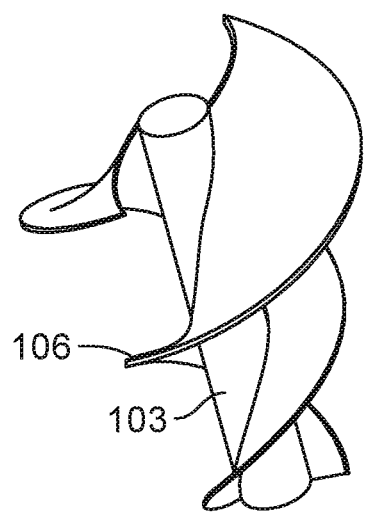
FIG. 3F is a perspective view of an example of a tube support that can be included in the aeration device of FIG. 1A.

FIGS. 3A through 3D show various views of a few rotating components of the device 100, such as the rotatable permeable member 103 and the tube support 106. FIG. 3A shows a top perspective view of those rotating components of the device 100. FIG. 3B shows a bottom perspective view of those rotating components of the device 100. FIG. 3C shows a side view of those rotating components of the device 100. FIG. 3D shows a cross-section of the side view shown in FIG. 3C. The tube support 106 can advantageously move liquid away from rotatable permeable member to prevent the coalescence of nano-bubbles.

FIG. 3E shows another example of the tube support 106. The rotatable permeable member 103 can be positioned within the tube support 106. The rotatable permeable member 103 (not shown) can pass through a central inner bore of the tube support 106. FIG. 3E shows another example of the tube support 106. The tube support 106 surrounds the rotatable permeable member 103. As shown in FIG. 3E, the tube support 106 can include one or more vanes.

Figure 4:
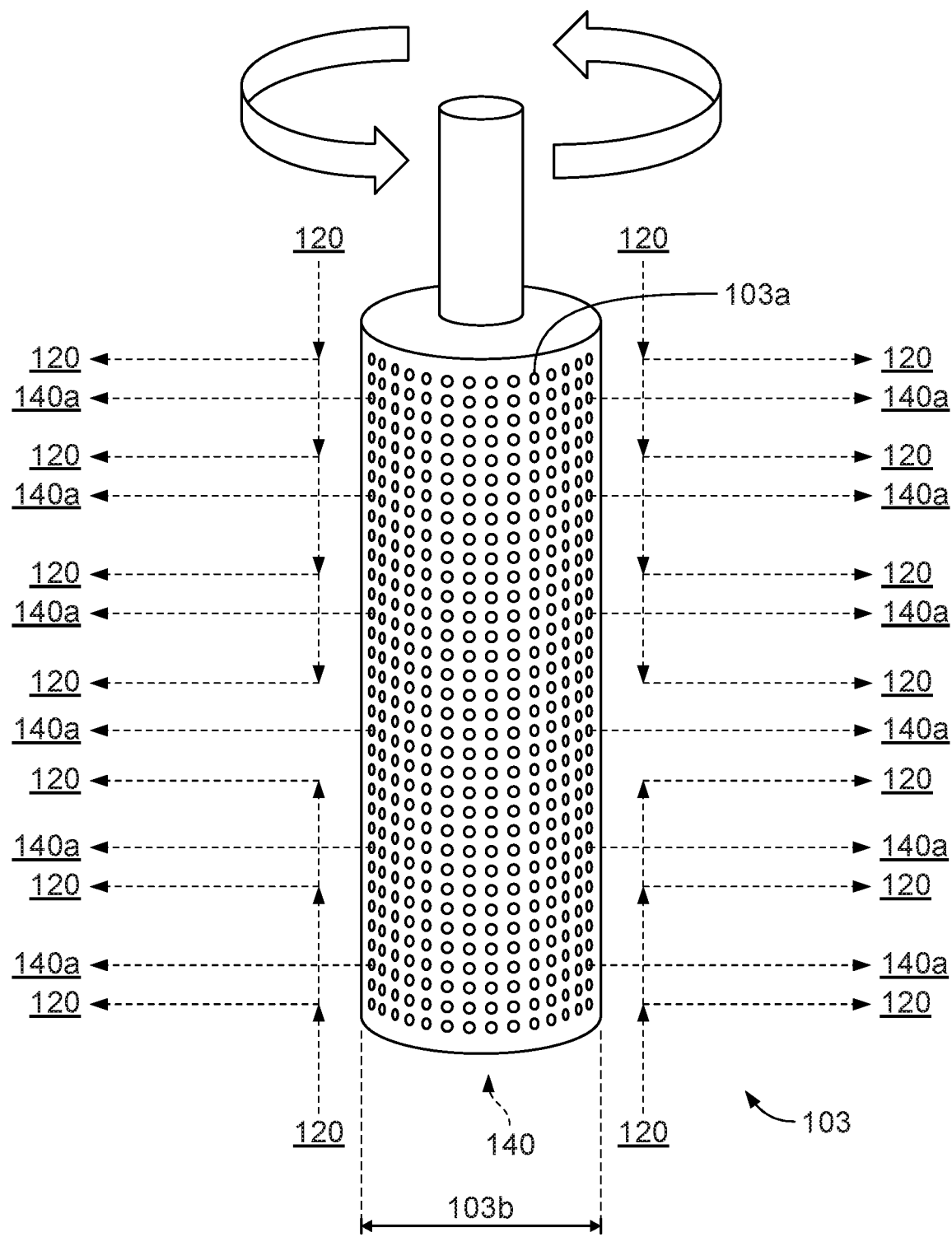
FIG. 4 is a schematic diagram of an example of a rotatable permeable member that can be included in the aeration device of FIG. 1A.

FIG. 4 shows an enlarged view of the rotatable permeable member 103. The rotatable permeable member 103 defines multiple pores 103a through which gas 140 can exit to generate the nano-bubbles 140a. The pores 103a can have a diameter that is less than or equal to 50 µm. In some implementations, the pores 103a have a diameter that is in a range of from 200 nm to 50 µm. The pores 103a can be of uniform size or varying size. The pores 103a can be uniformly or randomly distributed across a surface (e.g., outer surface) of the rotatable permeable member 103. The pores 103a can have any regular (e.g., circular) or irregular shape.

The rotatable permeable member 103 can couple to and rotate with a driving mechanism (not shown), such as a motor (150) coupled to a gearbox. Gas 140 is flowed into the rotatable permeable member 103. As the rotatable permeable member 103 rotates, the gas 140 exits through the pores 103a, where the surrounding liquid (e.g., water) shears them off under simulated turbulent flow conditions above the turbulent threshold to generate nano-bubbles 140a dispersed in the surrounding liquid. The surrounding liquid 120 can be, for example, water in which the introduction of one or more gases (e.g., aeration) is desired. During operation of the device 100, it is preferred that enough of the rotatable permeable member 103 is submerged in the liquid 120, so that all of the pores 103a are below the surface of the liquid 120.

In some implementations, non-structural factors that can affect the size of generated nano-bubbles 140a, such as the composition of the gas 140 being flowed into the rotatable permeable member 103, the rate at which the gas 140 is being flowed into the permeable member 103, the supply pressure of the gas 140 being flowed into the rotatable permeable member 103, the composition of the surrounding liquid 120, the flow rate (if any) of the surrounding liquid 120, and the pressure of the surrounding liquid 120.

Figure 5A:
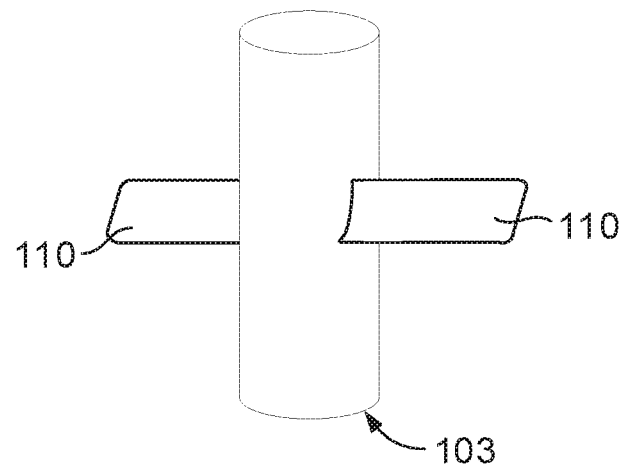
FIG. 5A is a perspective view of an example of a rotatable permeable member.
Figure 5B:
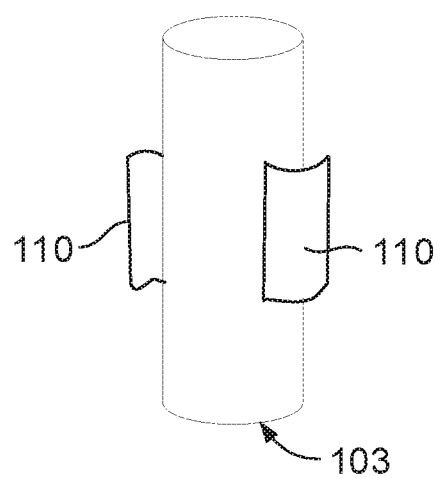
FIG. 5B is a perspective view of an example of a rotatable permeable member.
Figure 5C:
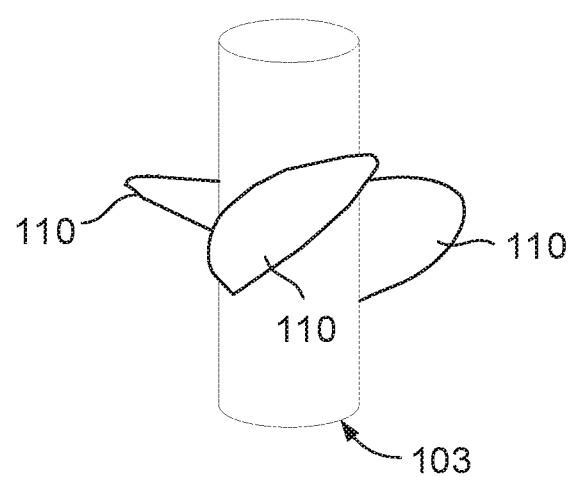
FIG. 5C is a perspective view of an example of a rotatable permeable member.

As shown in FIGS. 5A-5C, the rotatable permeable member 103 can optionally include one or more radially-extending features 110 to facilitate liquid flow along its surface. The radially-extending feature 110 is configured to move the liquid away from an outer surface of the body of the rotatable permeable member and simulate turbulent flow above the turbulent threshold in the liquid that allows the liquid to shear gas from the outer surface of the rotatable permeable member, thereby forming nano-bubbles in the liquid. For example, in some embodiments, non-limiting examples of the radially-extending features 110 include wings (see FIG. 5A), vanes (see FIG. 5B), or propeller (see FIG. 5C). A radially-extending feature can be fixedly coupled to (or be integral with) the exterior surface of the rotatable permeable member 103 to move liquid away from rotatable permeable member to prevent nano-bubble coalescence. In certain such implementations, the tube support 106 may not be required to facilitate flow within the device and, thus, is optional.

In some implementations, the radial-extending features 110 can be coupled to the tube support 106 or/and the rotatable permeable member 103 (e.g., like a hub and spoke configuration)

Figure 6:
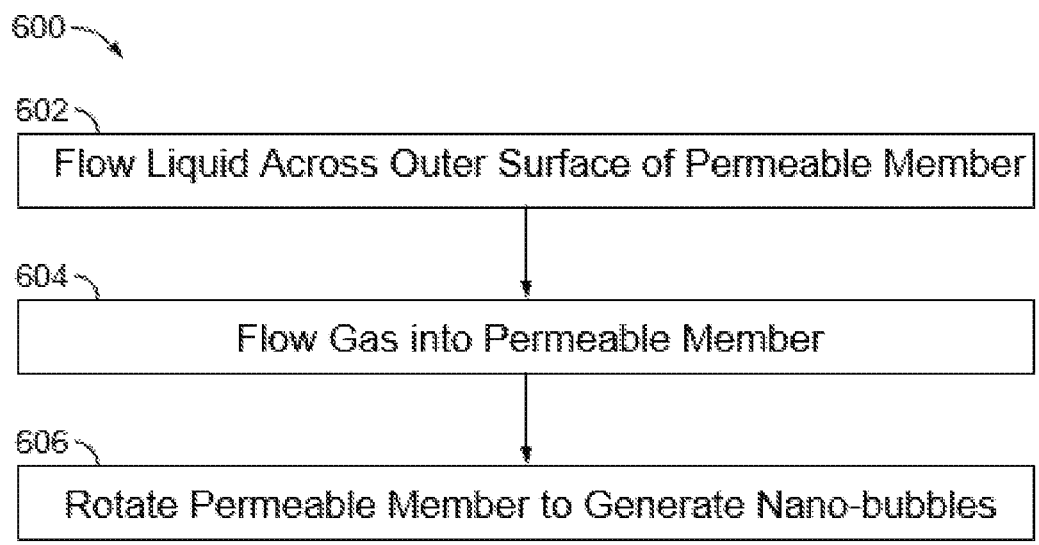
FIG. 6 is a flow chart of an example method for liquid aeration.

FIG. 6 is a flow chart of a method 600 for liquid aeration. The method 600 can be implemented, for example, using the aeration device 100. At step 602, a liquid (for example, the surrounding liquid 120) is flowed across a surface (e.g., outer surface) of a rotatable permeable member (for example, the rotatable permeable member 103). The liquid 120 can be flowed across the surface of the permeable member 103, for example, by submerging the rotatable permeable member 103 in the liquid 120. A perforated housing (for example, the housing 102) can surround the rotatable permeable member 103. In some implementations, once the rotatable permeable member 103 is submerged in the liquid 120, flow of liquid 120 can be induced, for example, by one or more rotating impellers. For example, the motor 150 can rotate one or more impellers to induce flow of liquid 120 into and out of the tube support 106, which surrounds the rotatable permeable member 103.

At step 604, a gas (for example, the gas 140) is flowed into the rotatable permeable member 103. The gas 140 can be flowed into the rotatable permeable member 103, for example, by a blower or air pump connected to the gas inlet 104. In some implementations, the pressure of the gas 140 flowing into the rotatable permeable member 103 is at least 1 atmosphere (atm). In some implementations, the pressure of the gas 140 flowing into the rotatable permeable member 103 is at most 10 atm. In some implementations, the pressure of the gas 140 flowing into the rotatable permeable member 103 is in a range of from 1 atm to 10 atm, or 2 atm to 8 atm. In some implementations, the pressure of the gas 140 flowing into the rotatable permeable member 103 is in a range of from 7 atm to 8 atm.

At step 606, the rotatable permeable member 103 is rotated to generate nano-bubbles (for example, the nano-bubbles 140a) from the gas 140 and expel the generated nano-bubbles 140a to the liquid 120 around the surface of the rotatable permeable member 103. The rotatable permeable member 103 can be rotated at step 606 by a driving mechanism, such as a rotating shaft 150a of a motor 150 or a gearbox. The tube support 106 rotates with the rotatable permeable member 103. The rotatable permeable member 103 (and tube support 106) can be rotated at step 606 at a rotational speed that simulates turbulent flow above the turbulent threshold of the surrounding liquid 120 at the rotating surface of the rotatable permeable member 103 to form nano-bubbles.

Figure 7:
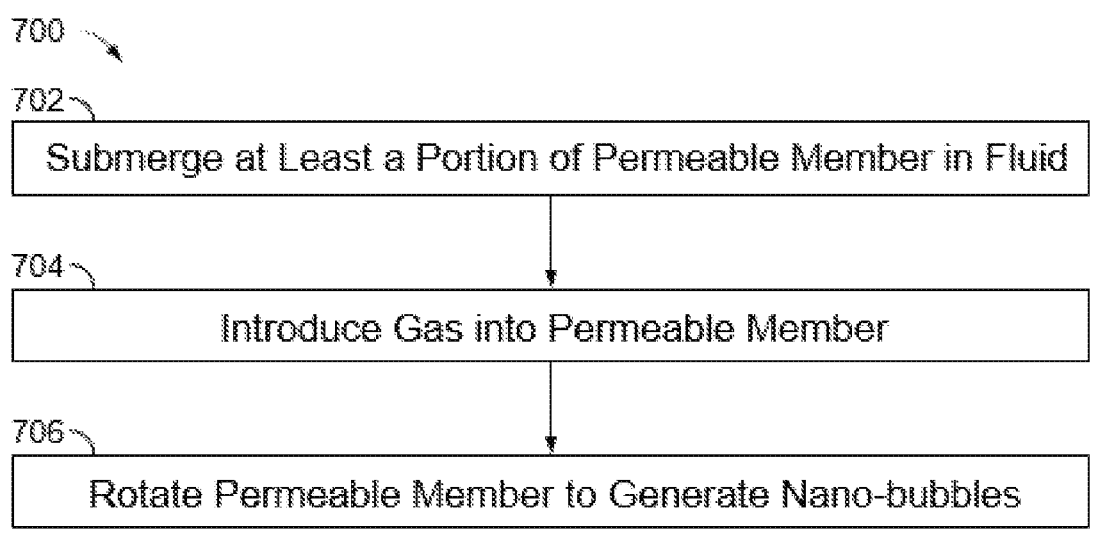
FIG. 7 is a flow chart of an example method for liquid aeration.

FIG. 7 is a flow chart of a method 700 for liquid aeration. The method 700 can be implemented, for example, using the aeration device 100. At step 702, at least a portion of a rotatable permeable member (for example, the rotatable permeable member 103) is submerged in a liquid (for example, the surrounding liquid 120). As described previously, the rotatable permeable member 103 is disposed within the housing 102 defined by the lateral wall 102a extending between the first end 102b and the second end 102c. The housing 102 defines multiple perforations 102d on its lateral wall 102a to promote flow of the liquid into and out of the housing. In some implementations, the tube support 106 can define multiple blade or wing structures (see, for example, FIGS. 3E and 3F) to facilitate flow of the liquid to and from the rotatable permeable member 103. The rotatable permeable member 103 is coupled to the rotatable shaft 150a of the motor 150. At step 704, gas (such as the gas 140) is introduced into the rotatable permeable member 103 either directly or indirectly through a gas inlet (for example, the gas inlet 104). At step 706, the rotatable shaft 150a couples to the rotatable permeable member 103 is rotated, thereby generating nano-bubbles (for example, the nano-bubbles 140a) from the gas 140. In various implementations, rotating the rotatable shaft 150a at step 706 includes rotating the rotatable permeable member 103 (and the tube support 106) at a rotational speed that simulates flow at or above the turbulent threshold of the surrounding liquid 120 at the surface of the rotatable permeable member 103 (similar to step 606 of method 600).

Any of the devices (or apparatuses), and methods described herein include producing nano-bubbles having a mean diameter less than 1 μm in a liquid volume (e.g., body of water). In some embodiments, the nano-bubbles have a mean diameter ranging from about 10 nm to about 500 nm, about 75 nm to about 200 nm, or about 50 nm to about 150 nm. The nano-bubbles in the composition may have a unimodal distribution of diameters, where the mean bubble diameter is less than 1 μm. In some embodiments, any of the compositions produced by the devices (or apparatuses), and methods described herein include nano-bubbles, but are free of micro-bubbles.

The devices (or apparatuses), and methods described herein include producing a high concentration of nano-bubbles dispersed in the liquid volume exiting the apparatus. In some embodiments, the devices (or apparatuses), and methods described herein include producing a high concentration of nano-bubbles at its outlet that is at least $1\times10^6$ nano-bubbles/ml, at least $1\times10^7$ nano-bubbles/ml, or at least $1\times10^8$ nano-bubbles/ml. The apparatus and method provided herein can produce compositions in which the liquid carrier contains nano-bubbles that remain stable over a desired time. In some embodiments, the composition provided herein contain nano-bubbles that are stable in the liquid carrier for at least one month, and preferably at least 3 months, under ambient pressure and temperature.

Particular implementations of the subject matter have been described. Nevertheless, it will be understood that various modifications, substitutions, and alterations may be made. While operations are depicted in the drawings or claims in a particular order, this should not be understood as requiring that such operations be performed in the particular order shown or in sequential order, or that all illustrated operations be performed (some operations may be considered optional), to achieve desirable results. Accordingly, the previously described example implementations do not define or constrain this disclosure.

What is claimed is:

1. An apparatus for producing nano-bubbles in a volume of liquid, the apparatus comprising:
    a motor comprising a rotatable shaft;
    an axially rotatable permeable member including a body having a wall and a plurality of pores through which gas introduced into the axially rotatable permeable member can flow, the axially rotatable permeable member couplable to a gas inlet configured to introduce the gas from a gas source into the axially rotatable permeable member, the axially rotatable permeable member coupled to the rotatable shaft of the motor and adapted to rotate along with the rotatable shaft; and
    a rotatable tube support including an elongate body having a wall and defining an inner cavity, the wall defining a plurality of perforations, the inner cavity of the rotatable tube support configured to house the axially rotatable permeable member, the rotatable tube support coupled to and rotatable along with the rotatable shaft of the motor, wherein the rotatable tube support, when rotated, is adapted to introduce the liquid into the inner cavity of the rotatable tube support and move the liquid away from an outer surface of the body of the axially rotatable permeable member, wherein the axially rotatable permeable member, when rotated, is adapted to simulate turbulent flow above the turbulent threshold in the liquid that allows the liquid to shear the gas from the outer surface of the axially rotatable permeable member, thereby forming the nano-bubbles in the liquid.

2. The apparatus of claim 1, wherein the axially rotatable permeable member is coupled to the rotatable tube support such that the axially rotatable permeable member is concentrically positioned within the rotatable tube support.

3. The apparatus of claim 1, wherein the perforations of the rotatable tube support are circular, semi-circular, rectangular, cubical, oblong, triangular, or slotted.

4. The apparatus of claim 1, further comprising a base and a housing, the housing defined by a lateral wall extending between a first end and a second end coupled to the base, the lateral wall defining a plurality of perforations, wherein the axially rotatable permeable member and rotatable tube support are disposed within the housing.

5. The apparatus of claim 4, wherein the housing is non-rotatably affixed to the base.

6. The apparatus of claim 4, further comprising an impeller disposed within the housing, wherein the impeller is adapted to induce flow of the liquid into and out of the housing and away from the surface of the axially rotatable permeable member.

7. The apparatus of claim 1, wherein the axially rotatable permeable member has an outer circumference defined by an outer diameter sized to simulate turbulent flow above the turbulent threshold of the liquid.

8. The apparatus of claim 1, wherein the pores of the axially rotatable permeable member have a diameter in a range of from 200 nm to 50 μm.

9. The apparatus of claim 1, the pores of the axially rotatable permeable member have a diameter that is less than or equal to 50 μm.

10. The apparatus of claim 1, wherein the nano-bubbles have a mean diameter less than 500 nm.

11. The apparatus of claim 1, wherein the nano-bubbles have a mean diameter less than 200 nm.

12. The apparatus of claim 1, wherein the nano-bubbles have a mean diameter ranging from about 10 nm to about 500 nm.

13. The apparatus of claim 1, wherein the nano-bubbles have a mean diameter ranging from about 75 nm to about 200 nm.

14. An apparatus for producing nano-bubbles in a volume of liquid, the apparatus comprising:
    a motor comprising a rotatable shaft;
    an axially rotatable permeable member including a body having a wall and a plurality of pores through which gas introduced into the axially rotatable permeable member can flow, the axially rotatable permeable member further comprising at least one radially-extending member, the axially rotatable permeable member couplable to a gas inlet configured to introduce the gas from a gas source into the axially rotatable permeable member, the axially rotatable permeable member coupled to the rotatable shaft of the motor and adapted to rotate along with the rotatable shaft;
    wherein the axially rotatable permeable member, when rotated, is adapted to move the liquid away from an outer surface of the body of the axially rotatable permeable member and simulate turbulent flow above the turbulent threshold in the liquid that allows the liquid to shear the gas from the outer surface of the axially rotatable permeable member, thereby forming the nano-bubbles in the liquid.

15. The method of claim 14, wherein the at least one radially-extending member comprises one or more wings, vanes, propellers, or combinations thereof.

* * * * *